United States Patent
Keely et al.

(10) Patent No.: US 7,259,753 B2
(45) Date of Patent: Aug. 21, 2007

(54) CLASSIFYING, ANCHORING, AND TRANSFORMING INK

(75) Inventors: Leroy B. Keely, Portola Valley, CA (US); Susanne Alysia Clark Cazzanti, Bellevue, WA (US); Dan Altman, Kirkland, WA (US); Charlton E. Lui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1339 days.

(21) Appl. No.: 09/750,288

(22) Filed: Dec. 29, 2000

(65) Prior Publication Data

US 2002/0049787 A1    Apr. 25, 2002

Related U.S. Application Data

(60) Provisional application No. 60/212,825, filed on Jun. 21, 2000.

(51) Int. Cl.
    *G09G 5/00*    (2006.01)
(52) U.S. Cl. ......................... 345/179; 715/854
(58) Field of Classification Search ............... 345/156, 345/173, 179, 854; 707/200, 205; 715/854
    See application file for complete search history.

(56) References Cited

U.S. PATENT DOCUMENTS

| | | | |
|---|---|---|---|
| 5,146,552 A | 9/1992 | Cassorla et al. | |
| 5,239,466 A | 8/1993 | Morgan et al. | |
| 5,434,965 A | 7/1995 | Matheny et al. | |
| 5,473,742 A | 12/1995 | Polyakov et al. | |
| 5,572,643 A | 11/1996 | Judson | |
| 5,613,019 A | 3/1997 | Altman et al. | |
| 5,625,833 A | 4/1997 | Levine et al. | |
| 5,632,022 A | 5/1997 | Warren et al. | |
| 5,680,636 A | 10/1997 | Levine et al. | |
| 5,682,439 A | 10/1997 | Beernink et al. | |
| 5,687,331 A | 11/1997 | Volk et al. | |
| 5,717,879 A | 2/1998 | Moran et al. | |
| 5,727,129 A | 3/1998 | Barrett et al. | |
| 5,729,687 A | 3/1998 | Rothrock et al. | |
| 5,737,599 A | 4/1998 | Rowe et al. | |
| 5,745,116 A | 4/1998 | Pisutha-Arnold | |
| 5,760,773 A | 6/1998 | Berman et al. | |
| 5,778,404 A * | 7/1998 | Capps et al. ................. | 715/531 |

(Continued)

FOREIGN PATENT DOCUMENTS

EP    0 902 379 A2    3/1999

(Continued)

OTHER PUBLICATIONS

Patent Abstracts of Japan, Publication No. 11327789 for Color Display and Electronic Blackboard System, publication date Nov. 30, 1999.

(Continued)

*Primary Examiner*—Amr A. Awad
(74) *Attorney, Agent, or Firm*—Banner & Witcoff, Ltd.

(57) ABSTRACT

Methods for classifying, anchoring, and transforming ink are disclosed. Ink drawings and ink annotations are captured and stored with additional information that allows the various described methods to associate the ink with one or more displayed elements. During reformatting or re-flowing a displayed document, the ink may be properly displayed as originally intended.

23 Claims, 17 Drawing Sheets

U.S. PATENT DOCUMENTS

| | | | |
|---|---|---|---|
| 5,790,818 | A | 8/1998 | Martin |
| 5,801,687 | A | 9/1998 | Peterson et al. |
| 5,821,925 | A | 10/1998 | Carey et al. |
| 5,832,263 | A | 11/1998 | Hansen et al. |
| 5,838,914 | A | 11/1998 | Carleton et al. |
| 5,845,262 | A | 12/1998 | Nozue et al. |
| 5,877,757 | A | 3/1999 | Baldwin et al. |
| 5,889,523 | A * | 3/1999 | Wilcox et al. ............. 345/854 |
| 5,893,126 | A | 4/1999 | Drews et al. |
| 5,893,132 | A | 4/1999 | Huffman et al. |
| 5,918,236 | A | 6/1999 | Wical |
| 5,920,694 | A | 7/1999 | Carleton et al. |
| 5,931,912 | A | 8/1999 | Wu et al. |
| 5,933,140 | A | 8/1999 | Strahorn et al. |
| 5,937,416 | A | 8/1999 | Menzel |
| 5,948,040 | A | 9/1999 | DeLorme et al. |
| 5,950,214 | A | 9/1999 | Rivette et al. |
| 5,978,818 | A | 11/1999 | Lin |
| 5,983,248 | A | 11/1999 | De Rose et al. |
| 5,986,665 | A | 11/1999 | Wrey et al. |
| 6,011,537 | A | 1/2000 | Slotznick |
| 6,012,055 | A | 1/2000 | Campbell et al. |
| 6,018,334 | A | 1/2000 | Eckerberg et al. |
| 6,018,342 | A | 1/2000 | Bristor |
| 6,018,742 | A | 1/2000 | Herbert, III |
| 6,035,330 | A | 3/2000 | Astiz et al. |
| 6,049,812 | A | 4/2000 | Bertram et al. |
| 6,052,514 | A | 4/2000 | Gill et al. |
| 6,054,990 | A | 4/2000 | Tran |
| 6,081,829 | A | 6/2000 | Sidana |
| 6,088,481 | A | 7/2000 | Okamoto et al. |
| 6,091,930 | A | 7/2000 | Mortimer et al. |
| 6,094,197 | A | 7/2000 | Buxton et al. |
| 6,101,280 | A * | 8/2000 | Reynolds .................... 382/241 |
| 6,118,437 | A | 9/2000 | Fleck et al. |
| 6,122,649 | A | 9/2000 | Kanerva et al. |
| 6,128,007 | A | 10/2000 | Seybold |
| 6,157,381 | A | 12/2000 | Bates et al. |
| 6,181,344 | B1 | 1/2001 | Tarpenning et al. |
| 6,195,679 | B1 | 2/2001 | Bauersfeld et al. |
| 6,195,694 | B1 | 2/2001 | Chen et al. |
| 6,199,082 | B1 | 3/2001 | Ferrel et al. |
| 6,205,455 | B1 | 3/2001 | Umen et al. |
| 6,230,171 | B1 | 5/2001 | Pacifici et al. |
| 6,239,792 | B1 | 5/2001 | Yanagisawa et al. |
| 6,262,719 | B1 | 7/2001 | Bi et al. |
| 6,271,840 | B1 | 8/2001 | Finseth et al. |
| 6,279,005 | B1 | 8/2001 | Zellweger |
| 6,279,014 | B1 | 8/2001 | Schilit et al. |
| 6,289,362 | B1 | 9/2001 | Van Der Meer |
| 6,301,590 | B1 | 10/2001 | Siow et al. |
| 6,321,244 | B1 | 11/2001 | Liu et al. |
| 6,331,867 | B1 | 12/2001 | Eberhard et al. |
| 6,335,727 | B1 * | 1/2002 | Morishita et al. ........... 345/179 |
| 6,340,967 | B1 * | 1/2002 | Maxted ....................... 345/179 |
| 6,356,287 | B1 | 3/2002 | Ruberry et al. |
| 6,369,811 | B1 | 4/2002 | Graham et al. |
| 6,389,434 | B1 | 5/2002 | Rivette et al. |
| 6,393,422 | B1 | 5/2002 | Wone |
| 6,405,221 | B1 | 6/2002 | Levine et al. |
| 6,421,065 | B1 | 7/2002 | Walden et al. |
| 6,446,110 | B1 | 9/2002 | Lection et al. |
| 6,460,058 | B2 | 10/2002 | Koppolu et al. |
| 6,486,895 | B1 | 11/2002 | Robertson et al. |
| 6,490,603 | B1 | 12/2002 | Keenan et al. |
| 6,535,294 | B1 | 3/2003 | Arledge, Jr. et al. |
| 6,539,370 | B1 | 3/2003 | Chang et al. |
| 6,549,220 | B1 | 4/2003 | Hsu et al. |
| 6,560,621 | B2 | 5/2003 | Barile |
| 6,571,295 | B1 | 5/2003 | Sidana |
| 2002/0097261 | A1 | 7/2002 | Gottfurcht et al. |

FOREIGN PATENT DOCUMENTS

| | | |
|---|---|---|
| EP | 001016983 A2 * | 5/2000 |
| WO | WO96/20908 | 7/1996 |
| WO | WO97/22109 | 6/1997 |
| WO | WO98/06054 | 2/1998 |
| WO | WO87/01481 | 3/1998 |
| WO | WO98/09446 | 3/1998 |
| WO | WO99/49383 | 9/1999 |

OTHER PUBLICATIONS

"Adobe Acrobat 3.0 Reader Online Guide", Adobe Systems, Inc., pp. 1-110.

Kunikazu, T., Patent Abstracts of Japan, Publication No. 11327789 for Color Display and Electronic Blackboard System, published Nov. 30, 1999.

Open eBook Forum, Open eBook™ Publication Structure 1.0, Sep. 1999 http://www.ebxwg.org/oebps/oebps1.0/download/oeb1-oebps.htm.

Kristensen, A., "Formsheets and the XML Forms Language" (Mar. 1999).

Dublin Core Resource Types: Structurality DRAFT: Jul. 24, 1997, Feb. 27, 1998.

Dublin Core Metadata Elements Set, Version 1.1: Reference Description 1999.

Dublin Core Metadata Initiative: User Guide Working Draft Jul. 31, 1998 1999.

SOFTBOOK® Press, The Leader in Internet-Enabled Document Distribution and Reading Systems; 1999 http://www.softbook.com/consumer/reader.asp.

Rocket eBook Using the Rocket eBook, 1999; http:///www.rocketbook.com/Products/Fag/using.html.

Explore the Features of the Rocket eBook; wysiwyg://212http://www.rocketbook.com/Products/Tour/index.html; publication date unknown, prior to filing a pplication.

Computer Networks and ISDN Systems "Responsive interaction for a large Web application: the meteror shower architecture in the WebWriter II Editor"; 1997, pp. 1508-1517.

Hirotsu et al., "Cmew/U—A Multimedia Web Annotation Sharing System", NTT Network Innovation Laboratories—Japan, IEEE, 1999, pp. 356-359.

Kuo et al., "A Synchronization Scheme for Multimedia Annotation", Multimedia Information Networking Laboratory, Tamkang University—Taiwan, IEEE, 1997, pp. 594-598.

aha! InkWriter, The simplicity of pen and paper, the power of word processing., Advertisement, 1993, 2 pp., aha! software corporation, Mountain View, CA.

aha! InkWriter, for Magic Cap "The fastest, most convenient way to create faxes, notes and messages." Advertisement, 1993, 1994, 2 pp., aha! software corporation, Mountain View, CA.

aha! 2.0 for Windows InkWriter, The power of word processing, the convenience of pen and paper, Advertisement, 1994, 1995, 2 pp., aha! software corporation, Mountain View, CA.

aha! software products, Web Page List of Products, Sep. 24, 1997, pp. 1-5, aha! software corporation, Mountain View, CA.

* cited by examiner

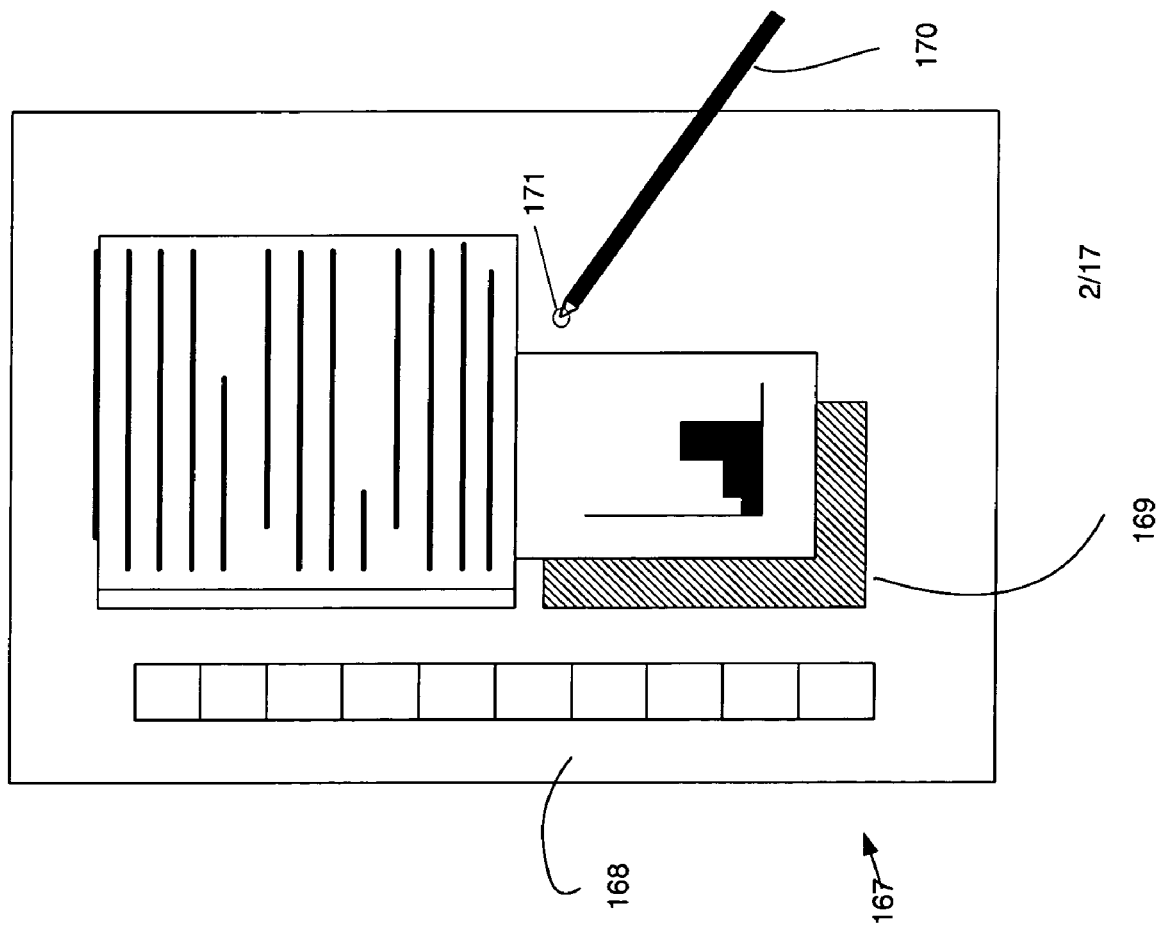

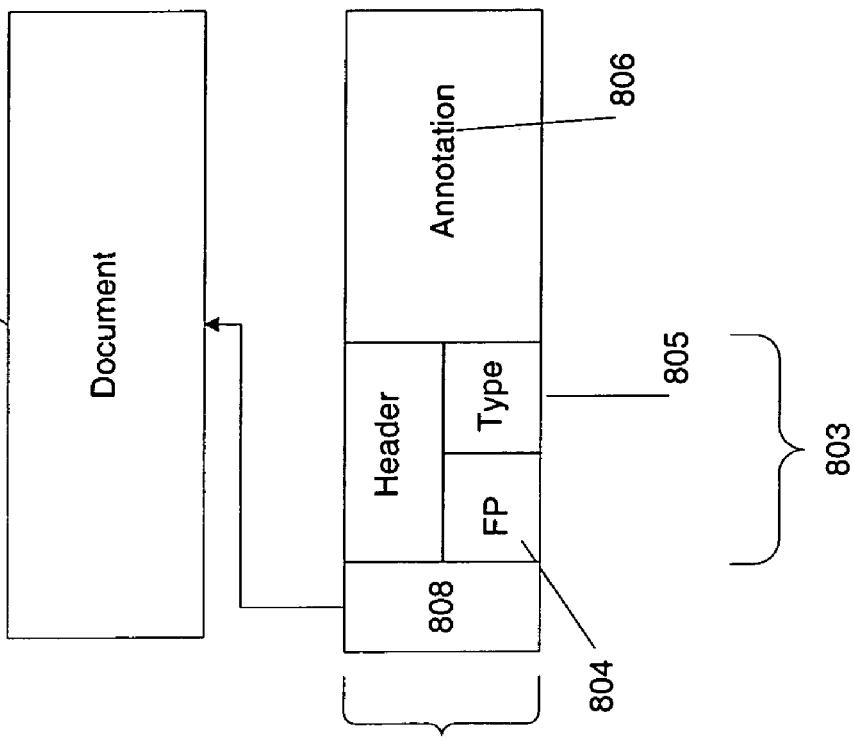
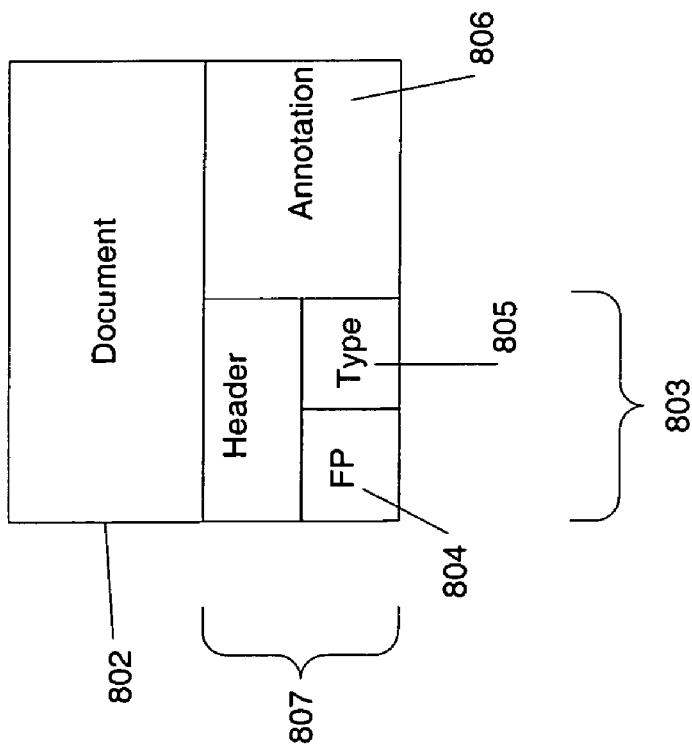

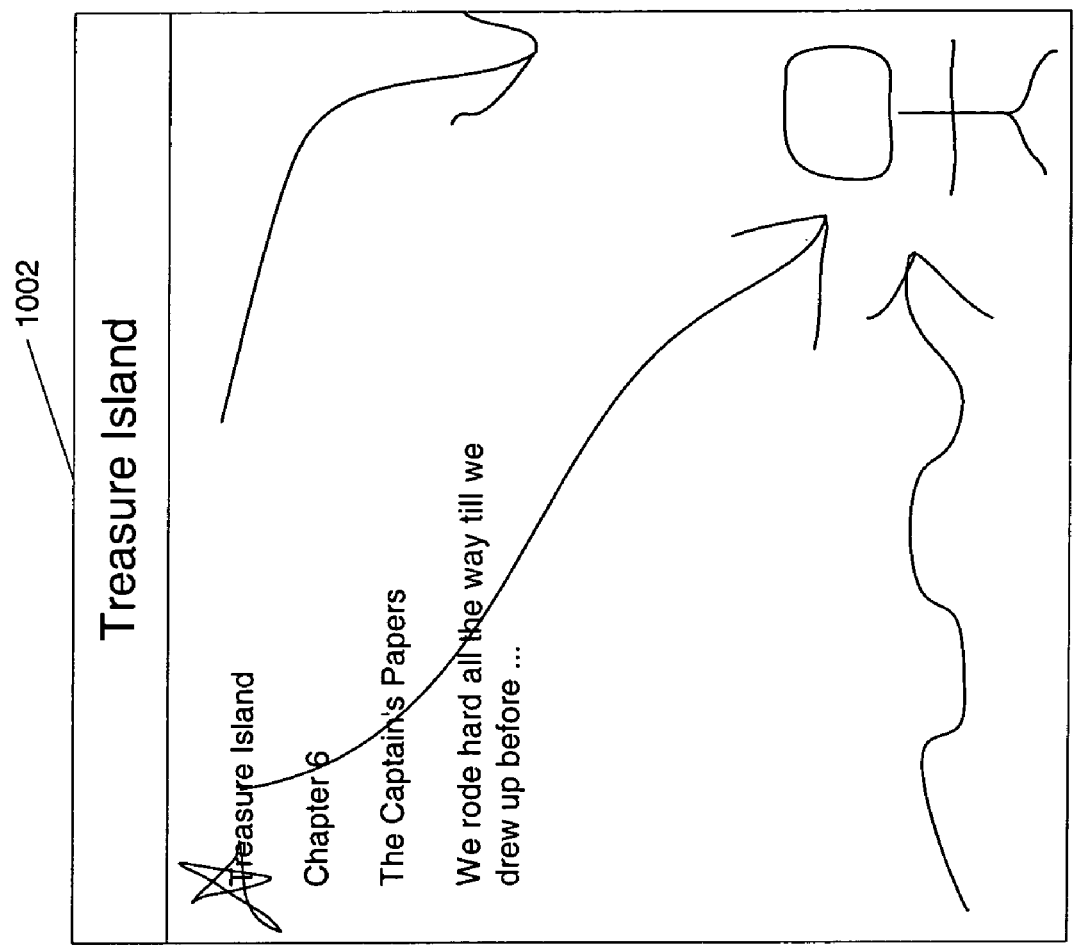
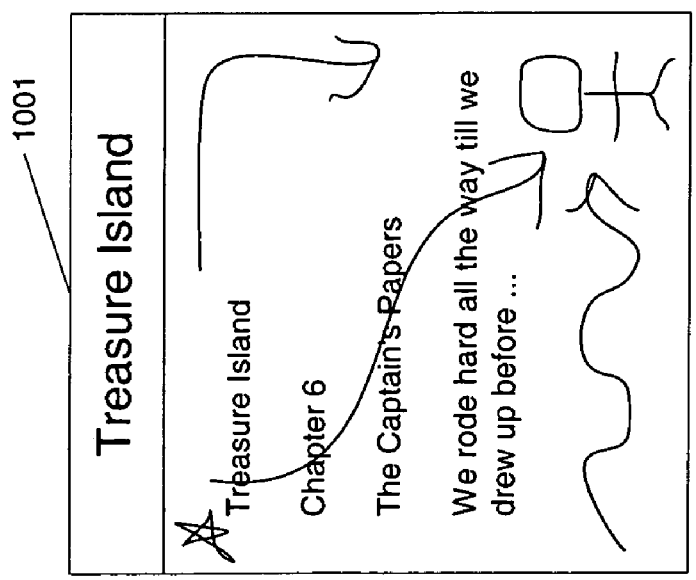
Figure 10

CLASSIFYING, ANCHORING, AND TRANSFORMING INK

1. RELATED APPLICATIONS

This application is related to U.S. Ser. No. 60/212,825, filed Jun. 21, 2000, entitled Methods for Classifying, Anchoring, and Transforming Ink Annotations" and U.S. Ser. No. 09/455,806, filed Dec. 7, 1999, entitled "Method and Apparatus For Capturing And Rendering Annotations For Non-Modifiable Electronic Content."

2. BACKGROUND

1. Technical Field

The disclosure generally relates to the electronic display of documents. More particularly, the disclosure relates to the placement and use of ink and annotations in electronically displayed documents.

2. Related Art

Many factors today drive the development of computers and computer software. One of these factors is the desire to provide accessibility to information virtually anytime and anywhere. The proliferation of notebook computers, personal digital assistants (PDAs), and other personal electronic devices reflect the fact that users want to be able to access information wherever they may be, whenever they want. In order to facilitate greater levels of information accessibility, the presentation of information must be made gas familiar and comfortable as possible.

In this vein, one way to foster success of electronic presentations of information will be to allow users to handle information in a familiar manner. Stated another way, the use and manipulation of electronically-presented information may mimic those paradigms that users are most familiar with, e.g., printed documents, as an initial invitation to their use. As a result, greater familiarity between users and their "machines" will be engendered, thereby fostering greater accessibility, even if the machines have greater capabilities and provide more content to the user beyond the user's expectations. Once users feel comfortable with new electronic presentations, they will be more likely to take advantage of an entire spectrum of available functionality.

One manner of encouraging familiarity is to present information in an electronic book format in which a computer displays information in a manner that closely resembles printed books. In order to more completely mimic a printed book, users will need to have the ability to make textual notes to themselves, akin to writing in the margins of paper books. Users will also want to highlight selected portions, as these are active-reading activities of which a user would expect to see in an electronic book. Users will want to add drawings, arrows, underlining, strike-throughs, and the like, also akin to writing in paper books. Finally, users will want to add bookmarks.

The above-identified so-called "active-reading" activities are available. In the case of any computer application with GUI that displays text, it can be assumed that the displayed text is of primary significance to the user. If the process of adding ink-marks to the primary text negatively impacts the presentation of the primary text, then the user is unlikely to frequently ink-annotate the electronic information and/or is unlikely to have a satisfactory ink-annotation experience. As a result, the perception of electronic books (or e-Books) as a step forward from paper books will suffer. What is needed is a mechanism to enhance the e-Book ink-annotation feature to match or surpass a similar experience with paper books.

Handwriting, scribbling, and marking on text are the most highly developed skills humans have for capturing short and graphical comments on documents. Only when computers can support these activities can they match the handiness of paper. Handwriting need not be recognized by the computer in order to be useful. But, it must be applicable wherever one could expect to be able to handwrite on a displayed document page. The writing should be visible without requiring any additional obstruction of the document, and without requiring any change to the layout of the document. Known methods for annotating documents fall short of these goals. Further, always associating an annotation with a singular element (a given page, for example) may create difficulties in rendering when re-flowing the text of a document. These difficulties include rending the annotation on a page different from the original subject of the annotation.

3. SUMMARY

The present invention provides a technique for adding electronic ink to an electronically displayed document. In the context of the present invention, a "document" encompasses all forms of electronically displayable information including but not limited to books, manuals, reference materials, picture books, etc. Electronic ink (also referred to as "ink" for simplicity) includes drawings, written text (or annotations), and highlighting. To create an annotation, a user selects an object in the document to locate where the annotation is to be placed. The computer system determines which object has been selected and anchors the ink or annotation. The user adds the annotation and, eventually, returns to reading the document. The annotations may be filtered, navigated, sorted, and indexed per user input. Annotations may include text annotations, drawings, highlights, bookmarks, and the like as is related to the general field of active reading. In one embodiment, the system modifies the content of the document to add an anchor to the document. In another embodiment, the system determines a file position associated with the selected object and anchors to the file position.

In the context of the present invention, a displayed "object" may include text, graphics, equations, and other related elements as contained in the displayed document. Annotations may include highlighting, adding textual notes, adding drawings (as one would expect to do with a pencil or pen to a paper book), and adding bookmarks.

Documents may be classified as modifiable and non-modifiable. In regards to modifiable documents, the system modifies the document to include the ink or annotation or at least adds a link at the location of the anchored object to the ink or annotation. In the case of non-modifiable documents, the system links the electronic ink to a file position in the non-modifiable document. The invention calculates the file position of, for example, the first character of the word (or other displayed element) and stores the file position with the annotation in a separate, linked local file. In a further embodiment, the file position anchoring of ink may be used in modifiable documents as well or when the non-modifiable document represents a non-modifiable portion of a file, with the annotations being added to a write-enabled portion of the file.

Another embodiment of the invention relates to scaling ink annotations to be rendered to look correct despite changing screen resolutions and screen sizes. Ink annotations are captured and stored as data points. Generally, the annotations are displayed as captured, meaning that the original data points are used to render the ink annotation. The problem is that screen resolutions may change or screen size may change, making the annotations be generated too large or too small for any subsequent viewing.

Here, the invention stores the annotation along with information regarding the system on which the annotation was captured including screen size and screen resolution. If the screen size or screen resolution is different on the displaying device from the stored information, the invention scales the data points defining the annotation to the new screen size or resolution.

Further, methods of anchoring an annotation to a point, an object, a range of objects, or a geometric region are known. But an ink stroke is unique among annotations in that its shape has a graphical meaning of its own, and further in that its shape and position may create multiple associations. However, these methods of anchoring have not maintained enough associations, nor have they provided logic for interpreting those associations along with the shapes of ink strokes, in order for those strokes to survive changes among the annotated elements.

To identify appropriate associations, the system and method first classifies the shape and then use this classification to help identify multiple independent elements that may be associated. The multiple independent anchors may include one or more objects and/or areas being annotated, as well as any other annotations that are near enough to be associated. Finally, the system and method use logic to transform the shape in complex ways when any of these other elements moves or changes.

These and other novel advantages, details, embodiments, features and objects of the present invention will be apparent to those skilled in the art from following the detailed description of the invention, the attached claims and accompanying drawings, listed herein, which are useful in explaining the invention.

4. BRIEF DESCRIPTION OF DRAWINGS

FIGS. 1A and 1B show a general-purpose computer and a handheld computer in accordance with embodiments of the present invention.

FIGS. 8A and 8B show various storage techniques for storing annotations in accordance with embodiments of the present invention.

FIG. 10 shows scaling of annotations in accordance with embodiments of the present invention.

5. DETAILED DESCRIPTION

The present invention relates to a system and method for capturing and associating annotations associated with a non-modifiable document.

Although not required, the invention will be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), hand-held devices, multiprocessor systems, microprocessor-based or programmable consumer electronics, network PCs, minicomputers, mainframe computers, and the like.

Figure 1A:
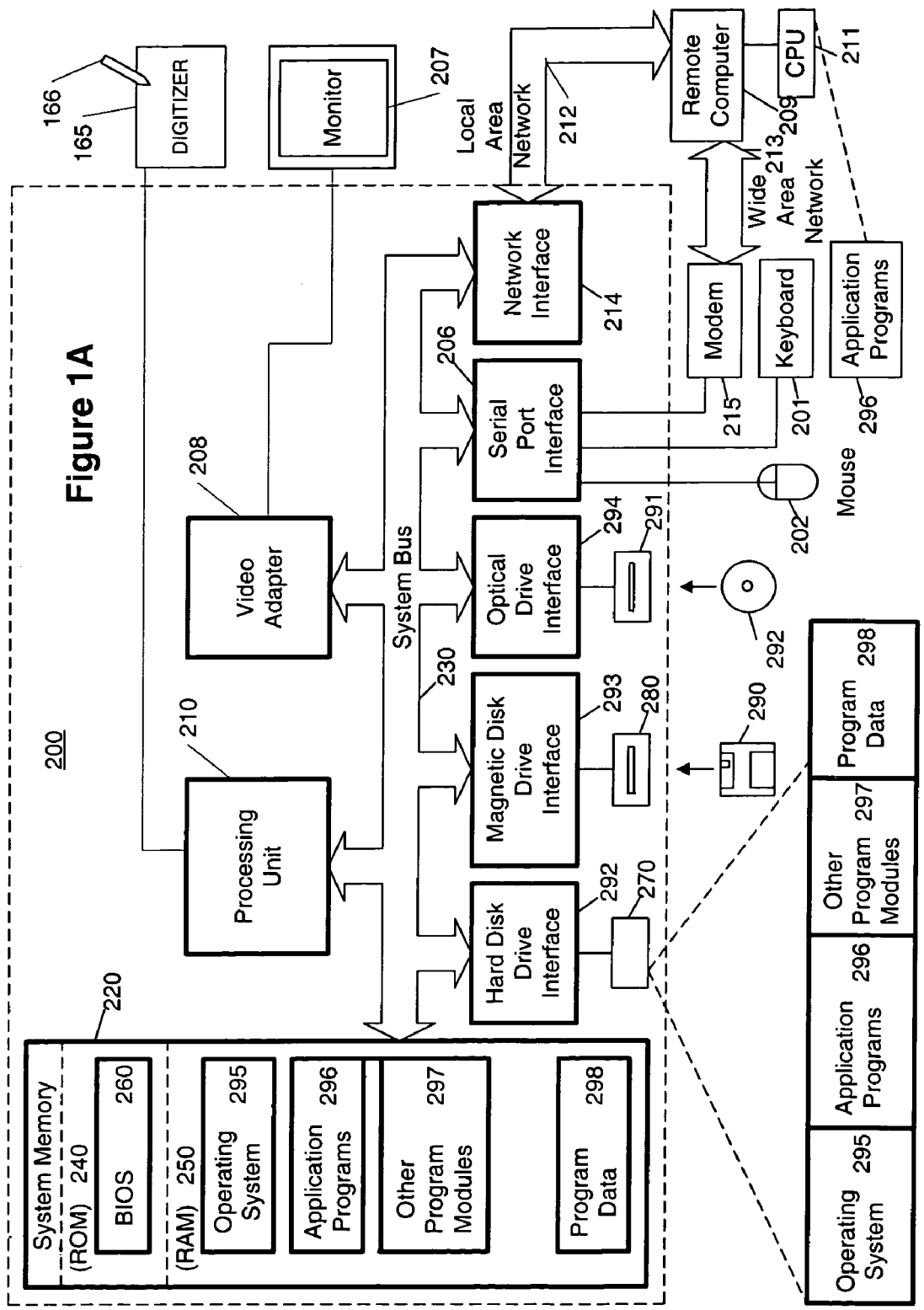

FIG. 1A is a schematic diagram of a computing environment in which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1A. The logical connections depicted in FIG. 1A include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

In one embodiment, a pen digitizer 165 and accompanying pen or stylus 166 are provided in order to digitally capture freehand input. Although a direct connection between the pen digitizer 165 and the processing unit 210 is shown, in practice, the pen digitizer 165 may be coupled to the processing unit 210 via a serial port, parallel port or other interface and the system bus 230 as known in the art. Furthermore, although the digitizer 165 is shown apart from the monitor 207, it is preferred that the usable input area of the digitizer 165 be co-extensive with the display area of the monitor 207. Further still, the digitizer 165 may be integrated in the monitor 207, or may exist as a separate device overlaying or otherwise appended to the monitor 207.

In addition to the system described in relation to FIG. 1A, the invention may be practiced on a handheld computer. Further, purpose-built devices may support the invention as well. In short, handheld computers and purpose-built devices are similar in structure to the system of FIG. 1A but may be limited to a display (which may be touch-sensitive to a human finger or stylus), memory (including RAM and ROM), and a synchronization/modem port for connecting the handheld computer and purpose-built devices to another computer or a network (including the Internet) to download and/or upload documents or download and/or upload annotations. The description of handheld computers and purpose-built devices is known in the art and is omitted for simplicity. The invention may be practiced using C. Also, it is appreciated that other languages may be used including C++, assembly language, and the like.

FIG. 1B illustrates a tablet PC 167 that can be used in accordance with various aspects of the present invention. Any or all of the features, subsystems, and functions in the system of FIG. 1A can be included in the computer of FIG. 1B. Tablet PC 167 includes a large display surface 168, e.g., a digitizing flat panel display, preferably, a liquid crystal display (LCD) screen, on which a plurality of windows 169 is displayed. Using stylus 170, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 167 interprets marks made using stylus 170 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. In another embodiment, the stylus may have only a writing portion on one or both ends. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Region 171 shows a feed back region or contact region permitting the user to determine where the stylus as contacted the digitizer. In another embodiment, the region 171 provides visual feedback when the hold status of the present invention has been reached.

Figure 2:
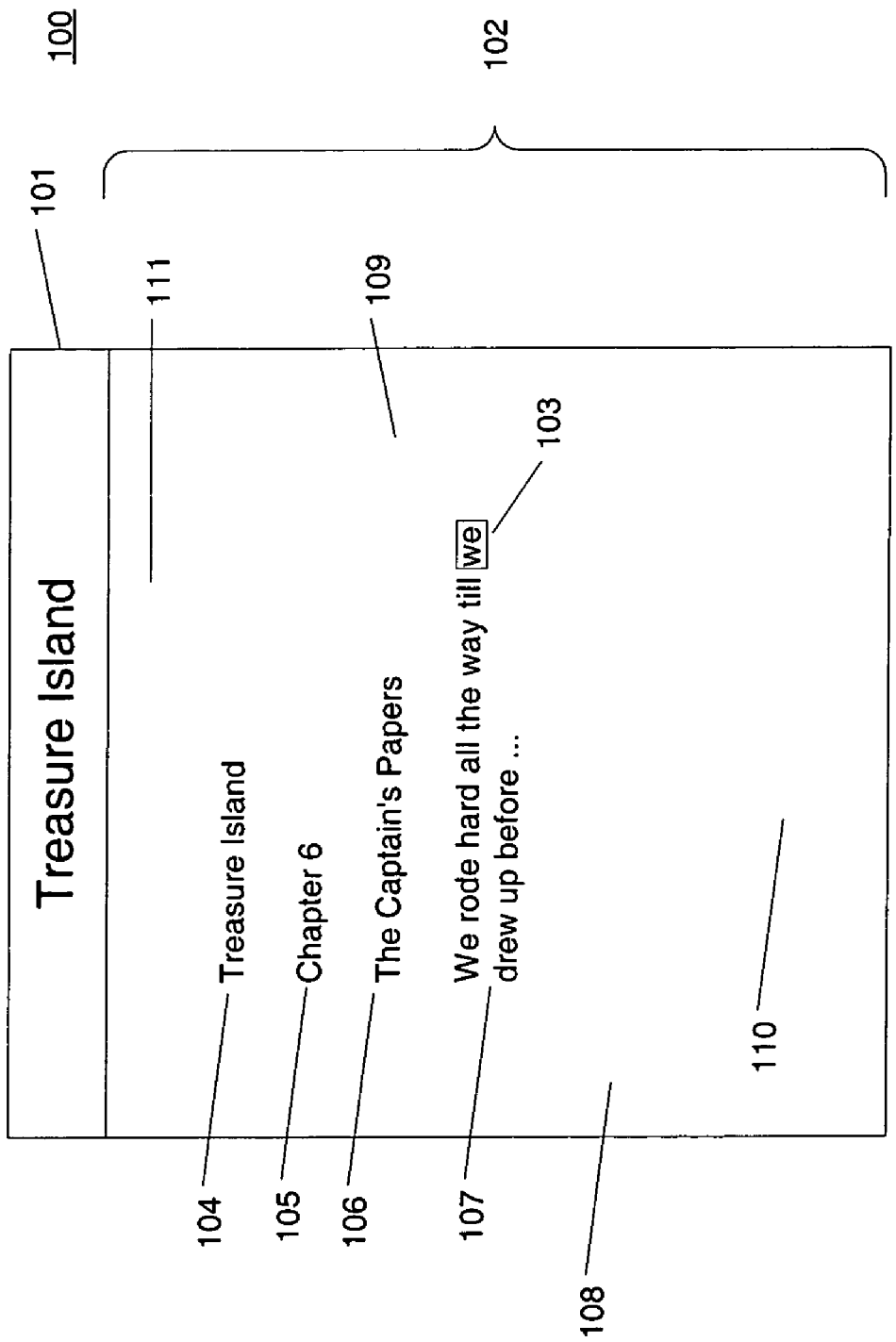
FIG. 2 shows a displayed document on a computer screen in accordance with embodiments of the present invention.

FIG. 2 shows a displayed document on a computer screen in accordance with embodiments of the present invention. As preferred, the document is displayed in a form that closely resembles the appearance of a paper equivalent of the e-book and, in this case, a paper novel. The document reader window 101 may comprise a variety of portions including a title bar 101 listing the title of the document and a body 102. In the body 102 of the display window, various portions of a document may be displayed. FIG. 2 shows an example where a title 104, a chapter number 105, a chapter title 106, and the text of the chapter 107 are displayed. Similar to an actual book, margins 108, 109, 110, and 111 appear around the displayed text. As referred to herein, the displayed elements may be independently referenced. Here for example, object 103 "we" has a drawing annotation placing a box around it as placed there by the user.

Various schemes exist with which to store electronically displayable information. In a first embodiment, the ink or annotation is stored within the document at the anchor location. Or, an anchor link is inserted at or near the object associated with the ink to permit the layout renderer to properly render the document and added ink or annotation. Further, the system may anchor to a file position in the document. Various descriptions relate to the use of the file position as an anchor. It is appreciated that the other embodiments may be used as well to anchor the ink or annotations including modification of the document itself to include the annotation or an anchor link at the location of the anchor position.

Figure 3A:
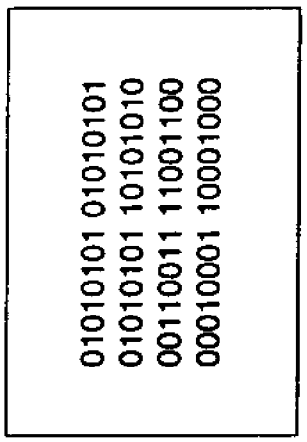
FIGS. 3A and 3B show different document formats available for storing a document in accordance with embodiments of the present invention.
Figure 3B:
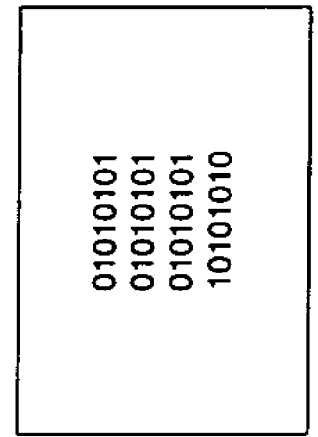

FIGS. 3A and 3B and related Figures describe the use of the file position to anchor the ink or annotation. The determined file position may be used for direct random access into the non-modifiable document despite the document being compressed or decompressed. In one embodiment, the file position is specified in a UTF-8 (a known textual storage format) document derived from an original Unicode (another known textual storage format). However, in order to conserve space, the non-modifiable document may be compressed using a general-purpose binary compression algorithm, decompressed, and translated to Unicode for viewing. Accordingly, the file position as stored for an annotation is consistent through various storage schemes and compression techniques. With respect to the storage of text, the industry standard is Unicode UCS-2. Unicode UCS-2 encodes text using two bytes per character. The letters from the standard English alphabet to complex symbols including foreign letters and symbols are all encoded using two bytes. FIG. 3A shows a pictorial representation of a four-letter word as stored in four pairs of bytes. Another storage scheme includes UTF-8 in which standard letters (for example, US-ASCII characters) are encoded using only a single byte. Foreign characters and symbols from the Unicode UCS-2 set are encoded with two or three bytes. Part of the first byte is used to indicate how many total bytes define the complete character as shown in FIG. 3B. The remaining bytes are restricted to numeric values that cannot be confused with those used to define a single-byte character. For large texts using standard letters, a UTF8-encoded file may have a size half of that as Unicode. However, in the situation in which a number of foreign characters or symbols, the size of the stored file may actually be larger than that of Unicode due to the greater number of three byte representations of a letter or symbol. Other variable byte-length character encodings have been used in industry, for example, the Shift-JIS standard encodes characters (drawn from a smaller set than Unicode draws from) in one or two bytes. Unlike in UTF-8, the second byte of a two-byte character may contain a value that may also be used by itself to represent a single-byte character.

Figure 4:
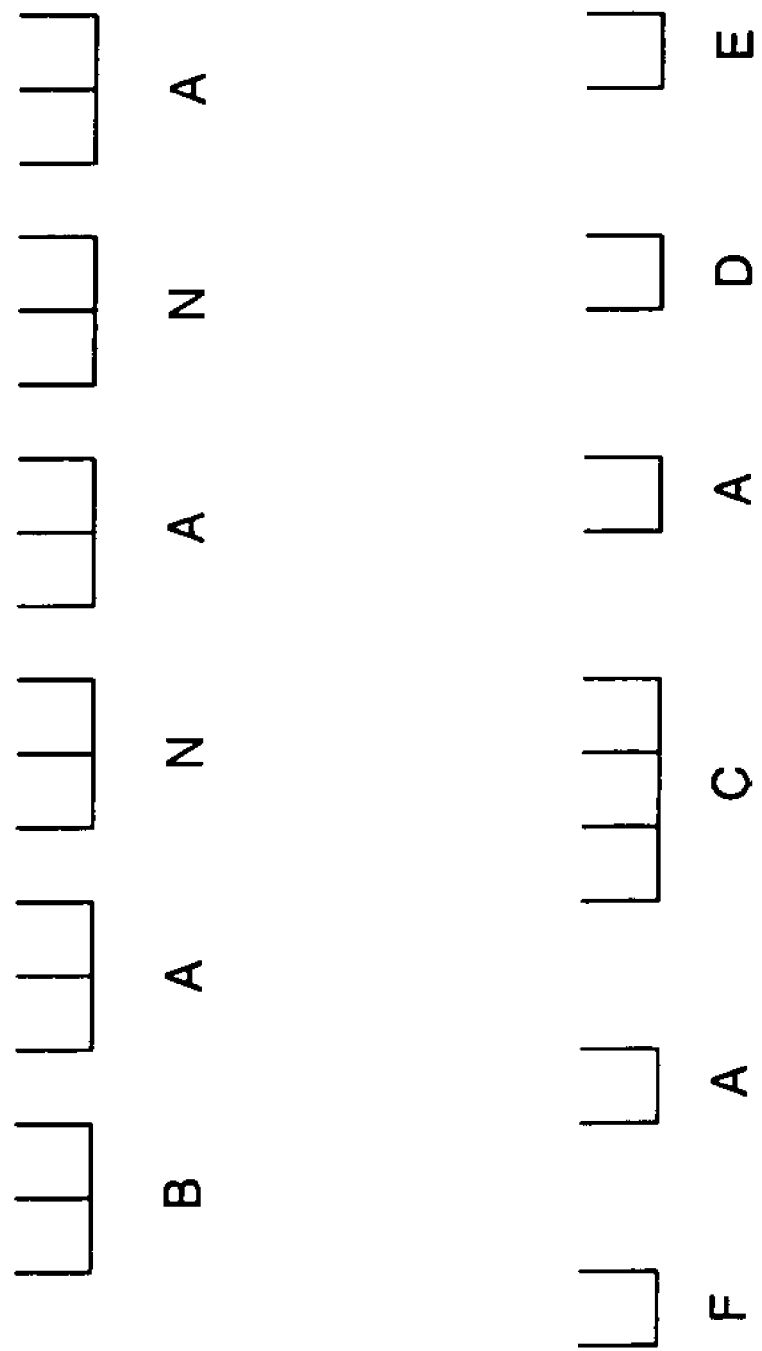
FIG. 4 shows different bytes for storing characters in UTF8 and Unicode in accordance with embodiments of the present invention.

FIG. 4 shows different bytes for storing characters in UTF8 and Unicode in accordance with embodiments of the present invention. An example of the two schemes discussed with respect to FIGS. 3A and 3B is shown in FIG. 4. The word "banana" takes twelve bytes to represent it in Unicode while only using six bytes in UTF8. The word "facade" requires twelve bytes in Unicode and eight bytes in UTF8. Other storage schemes are known in the art but not shown here for simplicity. The difference between UTF8 and Unicode is provided by way of example only and not intended to limit the invention to the use of storage scheme over the other.

The difference in the storage modes becomes relevant in the technique used to fix the file position for an annotation. If the file position is determined with one storage scheme, porting the file position to another storage scheme may not result in the same desired file position for an annotation. Thus, all annotations may be fixed to a file position based on the use of a single scheme. Preferably, the scheme used to hold the document while the document is being displayed is the scheme that is used to determine the file position. So, irrespective of whether the document is closed and compressed to another scheme, when reopened in the display scheme, the file position for the annotation remains the same as when created. Unicode may be the scheme used to display the document. Alternatively, UTF8 may be used as well as any other textual encoding or compression scheme to access the document for display.

Figure 5:
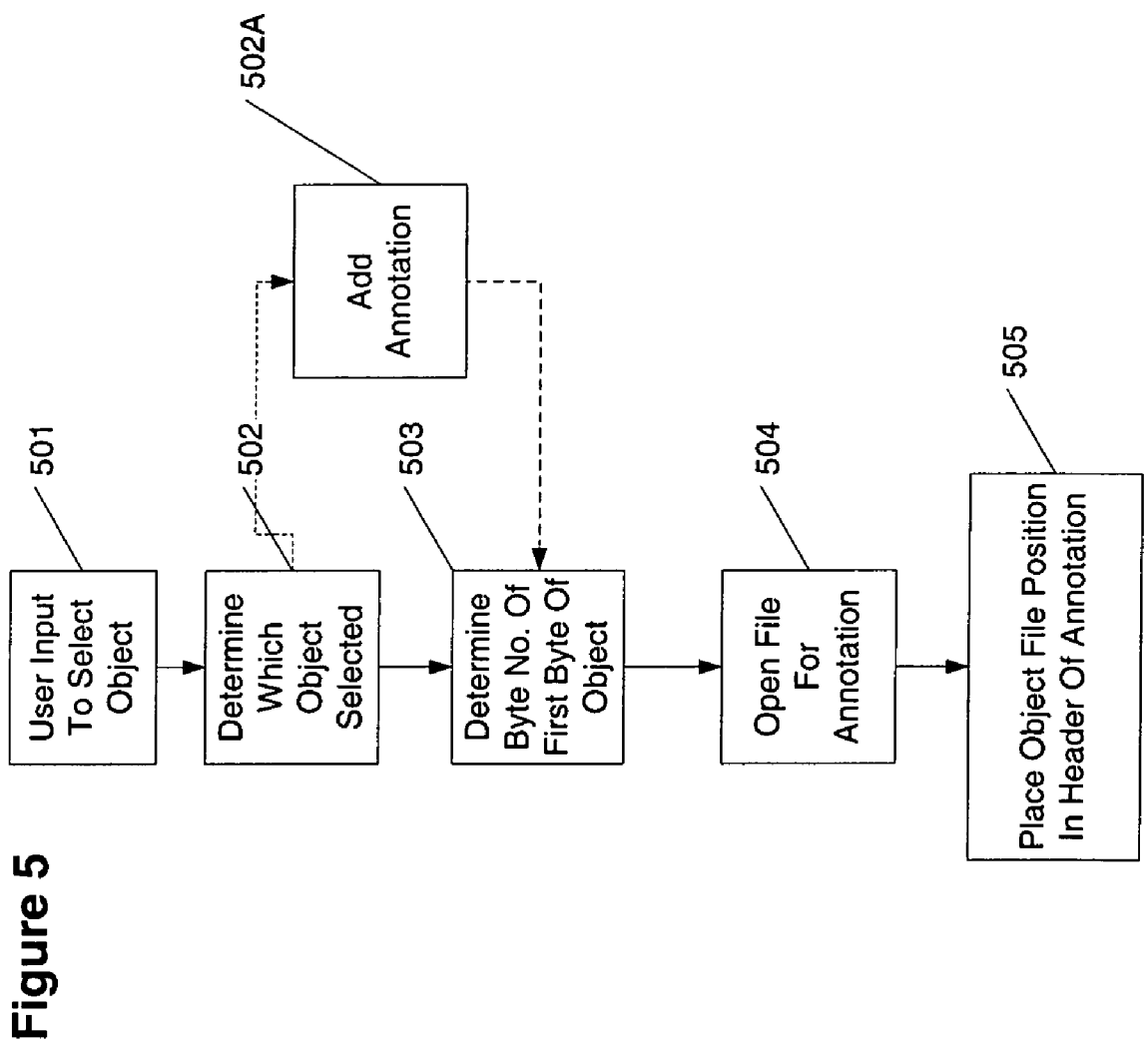
FIG. 5 shows a process for determining the file position of an object in accordance with embodiments of the present invention.

FIG. 5 shows a process for determining the file position of an object in accordance with embodiments of the present invention. In step 501, a user selects an object on the screen. The user may select the object via a cursor controlled through a mouse, touch-pad, trackball, or like pointing device. Alternatively, the user may use a stylus or finger if the surface of the display can accommodate such input.

In step 502, the system determines which object was selected by the user. This step relates to the conversion of the physical coordinates from the display device to coordinates inside the reader window. From this conversion, the object selected by the user is known.

Step 502A is optional. It relates to the user selection of an action post selection of the object. If the user is supplied with a menu after selection of the object and the function of adding an annotation is provided on the menu, step 502A relates to the selection of the adding the annotation function. An example of adding an annotation is described in detail in U.S. Ser. No. (BW 03797.84618), filed Dec. 7, 1999, entitled "Method and Apparatus for Capturing and Rendering Text Annotations For Non-Modifiable Electronic Content" whose contents are incorporated by reference for any essential subject matter.

Step 503 relates to the determination of the file position of the selected object. The file position may include the first byte of the selected object. Alternatively, the file position may be the first byte of the last character (or even the character following the last character) of the selected object. Selecting the first byte of the first character to determine the file position provides the advantage of displaying any annotation on the page of the beginning of the object, rather then on the next page if the object spans a page. Anyone of skill in the art will appreciate that any byte of the selected object (or surrounding the selected object) may be selected to provide the file position of the object. Alternatively, one may select a line in which the object resides or the paragraph or the portion of the page (e.g., the top, middle or bottom of the page).

The file position may be determined by counting the number of bytes from some known file position to the location of, for example, the first character of the selected object. The known file position may be the beginning of the file, or may be, for example, a previously noted file position for the beginning of the current paragraph. The counting step may be performed before or after generation of the annotation. Alternatively, the counting step may be performed in the background while the annotation is being created by the user. Note that annotation file positions may always stored as UTF-8 offsets within the text, as it stood before binary compression. However, the algorithm used to display the text works with Unicode characters. Therefore, in this example, it is necessary to work back from the selected object to a character with a known UTF-8 file position.

Because the binary file-format of the original publication (electronic book, document, etc.) intermixes markup (tags) with text, it is necessary to discount the bytes taken by such tags when calculating the file-position for the selected object (to which the annotation will be anchored). However, of these tags, many if not most do not take up a character-position on the display surface. Therefore, it is important to keep track of the starting file position of every run of text on the display, which corresponds to an unbroken run of text in the file. An "unbroken" run of text refers to text in the file that is not broken by a start- or an end-tag.

Therefore, the steps involved in accurately determining the file position for anchoring the annotation to the selected object may be generalized as:

1) Look up in our data structures what display character position is the start of an "unbroken" run described in the preceding paragraphs.
2) Fetch from the same data structure the file-position associated with the starting display-character position.
3) Determine the string which runs from the run-start position to the selection-start position. This string contains some number of Unicode characters.
4) Determine how many UTF-8 bytes would be required to hold a UTF-8-encdoded version of the string from step 3).
5) Add the UTF-8 bytecount from step 4 to the file-position from step 2.

Step 504 relates to creating a file to persist the annotation. While shown after step 503, it will be appreciated that it may occur prior to or during the determination of the file position of the object. In step 505, the file position is placed in the header of the file (or portion of the file) storing the created annotation. Alternatively, the file position may be appended to the file being viewed.

Figure 6:
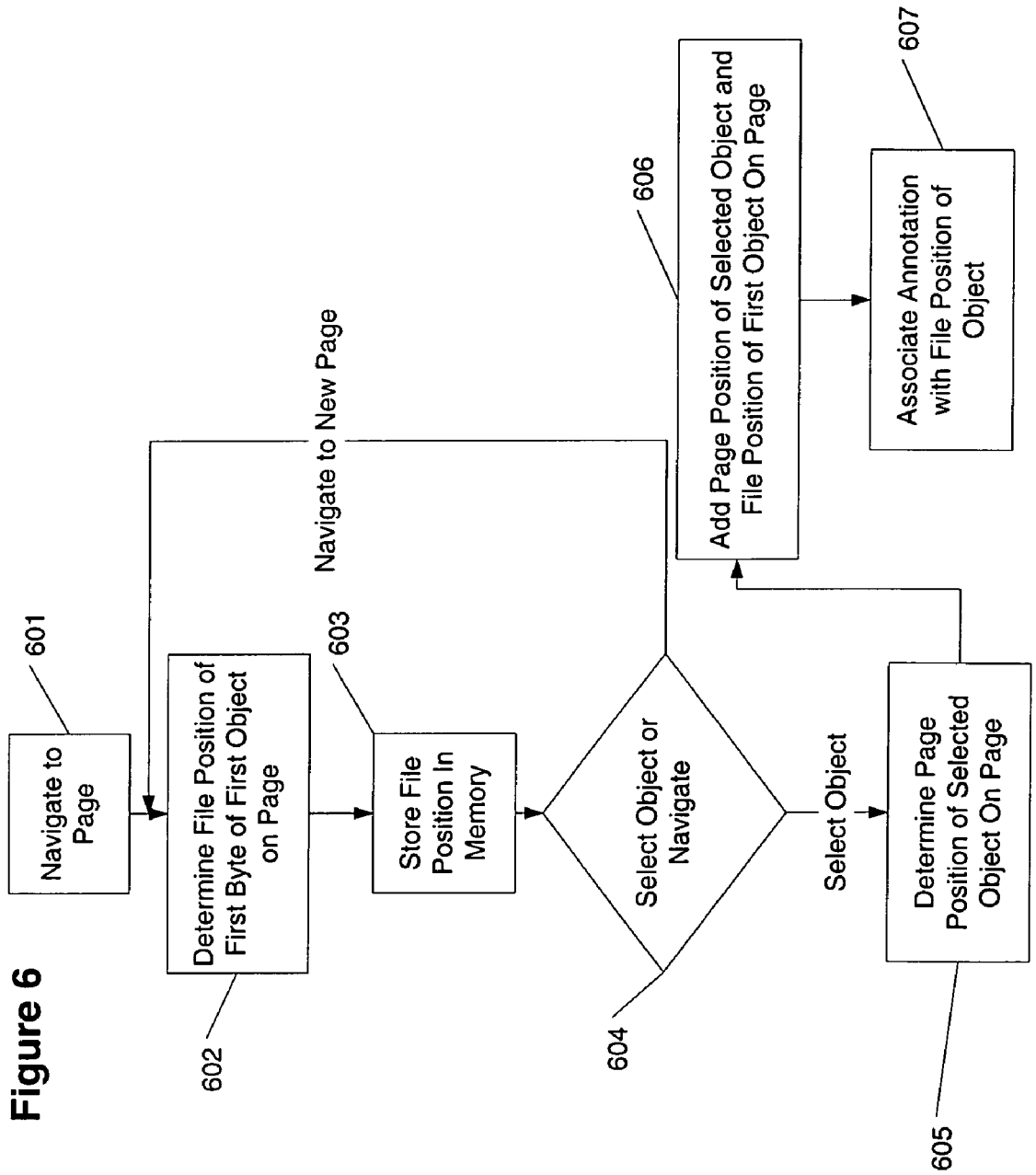
FIG. 6 shows another process for determining the file position of an object in accordance with embodiments of the present invention.

FIG. 6 shows another process for determining the file position of an object in accordance with embodiments of the present invention. As shown in step 601, a user navigates to a page. Once on the page, the system determines the file position of the first byte of the first object on the page as shown in step 602. The file position may be determined every time a new page is displayed. Alternatively, the system may pause (for example, two seconds) before starting to determine the file position for the first byte in order to allow the user to navigate to a new page before starting the file position determination. This delay provides the advantage of minimizing system workload when a user is quickly flipping pages. Once the user settles down with a given page, the system may then determine the file position of the first byte.

In step 603, the file position of the page is temporarily stored in memory.

In step 604, the system waits for either selection of an object or navigation to another page. More options are contemplated that do not need the file position for execution (for example, looking up a term in a reference document as disclosed in U.S. Ser. No. (BW 03797.84619) filed Dec. 7, 1999, entitled "Method and Apparatus for Installing and Using Reference Materials In Conjunction With Reading Electronic Content", whose contents are incorporated herein by reference in its entirety for any enabling disclosure).

In step 605, once an object is selected, the relative position of the selected object is determined with reference to the first byte of the first object on the displayed page.

In step 606, the file position of the first byte of the first object on the page as determined in step 602 is retrieved from memory (as stored in step 603) and added to the relative position of the first byte of the selected object as determined in step 605 to determine the file position of the selected object.

In step 607, the file position of the selected object is stored along with the created annotation. These steps relating to the determination of the file position may occur before or after the annotation for the object. Alternatively, the file position may be preformed in the background while the annotation is being created. Those skilled in the art will appreciate that any number of techniques may be used to determine object position and still be considered to be within the scope of the present invention.

Figure 7:
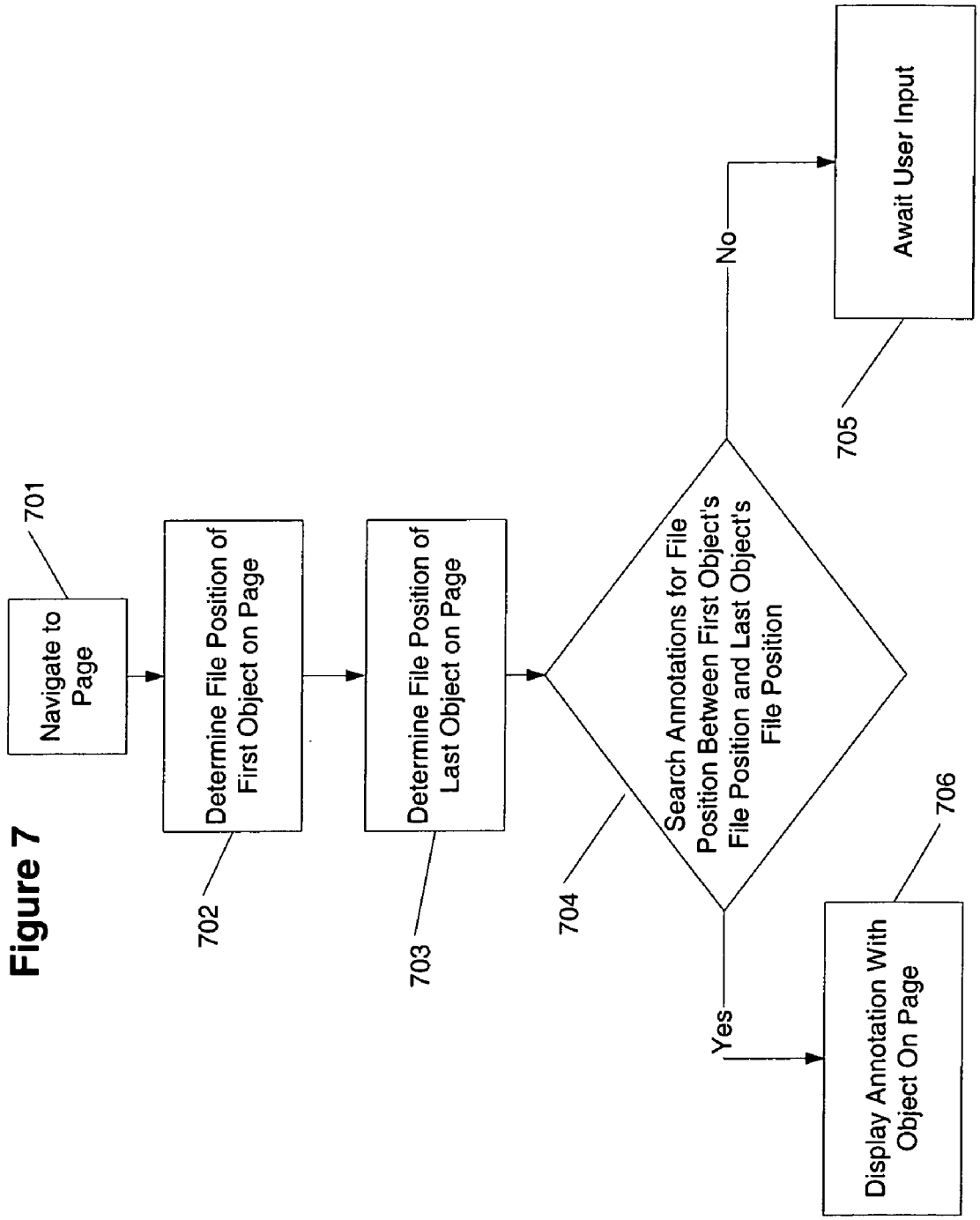
FIG. 7 shows a process for displaying annotations in accordance with embodiments of the present invention.

FIG. 7 relates to a process for displaying the created annotation when navigating to the page. In step 701, a user navigates to a page.

In step 702, the system determines the file position of the first object on the page.

In step 703, the system determines the file position of the last object on the page.

In step 704, the annotations stored for the document are searched to determine if any have file positions located between the file position determined in step 702 and the file position determined in step 703.

In step 705, if no annotations with a file position are located for display on the displayed page, the system waits for user input (including, for example, navigation to a new page or selection of an object for annotation, or any other action described herein).

In step 706, an annotation has been found that relates to an object on the page. The location of the object on the page is determined and the annotation is displayed for the object. The system for determining the location of the object may include subtracting the file position of the first object on the page from the file position of the annotated object. This difference is then used to determine how many bytes from the first character of the page is the annotated object. At this point, further annotations may be made, by returning from step 706 to step 705.

Alternatively, the system may count again from the beginning of the document to determine which object has been annotated. It will be appreciated by those skilled in the art that that numerous methods exist for displaying the annotation for the annotated object. The above examples are not intended to be limiting.

In the context of displaying the annotations that are determined to exist in a given "page" of the content (the unit of text being viewed by the user at any given time), the computer system will first validate a global state, which determines whether annotations should be rendered at all. For example, the user is provided with the ability to globally specify whether to show or hide drawing annotations (as well as text notes, bookmarks, highlights, etc.). Prior to displaying a particular annotation of an object, the computer system will check this global setting to determine whether or not to render the specific annotation. If the user has chosen to hide annotations of that particular type, the annotation will not be rendered.

FIGS. 8A and 8B show various storage techniques for storing annotations in accordance with embodiments of the present invention. FIG. 8A shows a document 801 that has modifiable (803-806) and non-modifiable (802) portions. Files of this type include Infotext file formats as are known in the art. Annotations 806 may be stored in combination with the non-modifiable content 802. An annotation 806 may be stored in a file with header 803 and body 806. The header 803 includes, for example, the file position 804 of the object with which the annotation 806 is associated. It may also include an indication of the type of annotation 806 in file portion 805. As discussed above, the annotation 806 may include a highlight, a bookmark, a drawing to be overlaid over the object, or a text annotation.

FIG. 8B shows the non-modifiable content 809 as a separate file apart from the annotation file. The annotation file 807 of FIG. 8B has similar constituent elements to that of annotation 807 of FIG. 8A. Annotation file 807 may include a file portion 808 that indicates to which non-modifiable document (here, 809) it is linked. Using the approach set forth in FIG. 8B, one file may store all annotations for a user with the non-modifiable content portions 809 being stored separately. This approach has the advantage of being able to quickly scan all annotations at one time rather than accessing all documents 801 (as including non-modifiable portions 802) to obtain all annotations stored therein.

Figure 9:
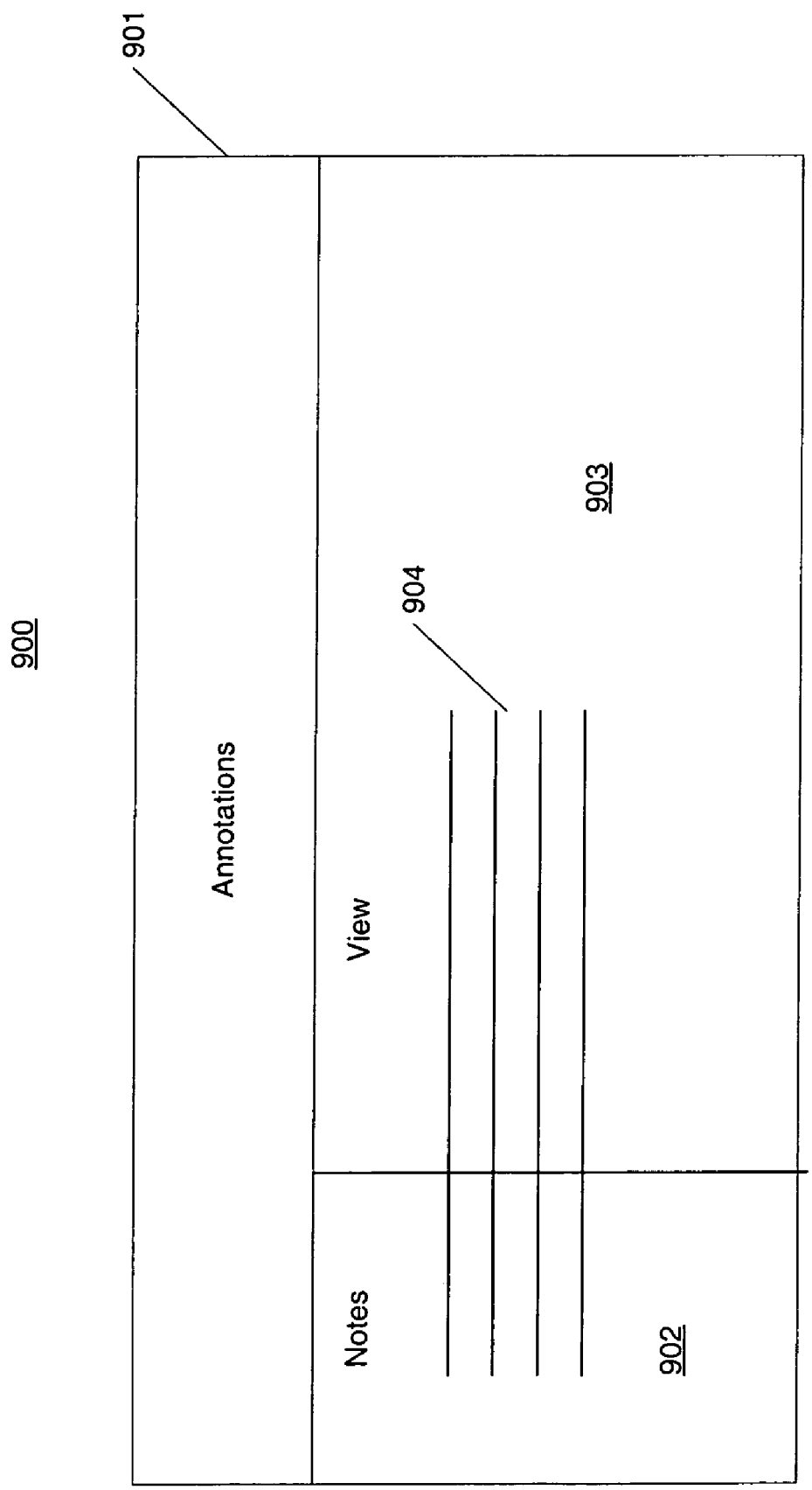
FIG. 9 shows a screen for manipulating annotations in accordance with embodiments of the present invention.
Figure 11:
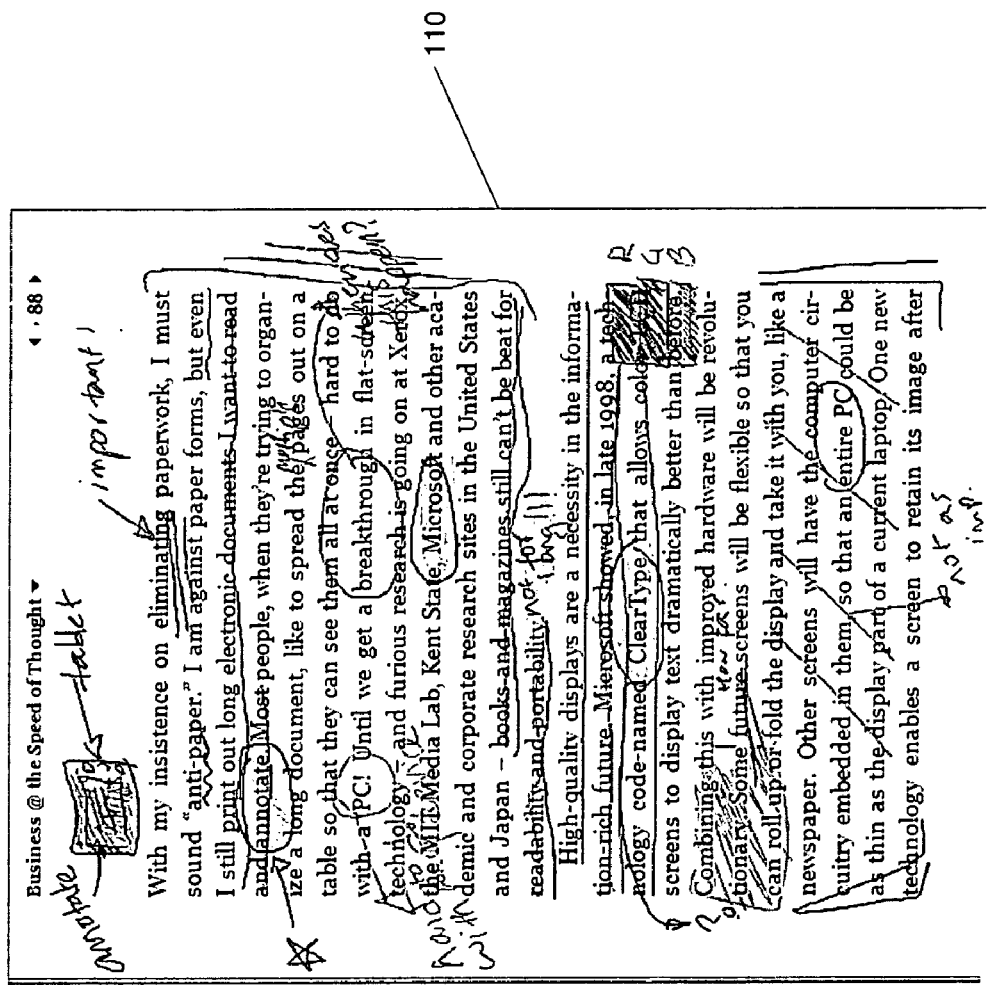
FIG. 11 shows an example of annotations in accordance with embodiments of the present invention.

FIG. 9 shows a display window for sorting, modifying, searching, and renaming the annotations stored in a system. The window 900 includes a title identifier 901 to alert the user that he or she is in an annotation pane 900. The window 900 may include two panes 902 and 903 (other panes may be added as needed). Panes 902 and 903 may provide a listing of annotations 904 by document. Alternatively, they may provide a listing of all annotations in a person's system. When in pane 902 (here, entitled "Notes"), the user may sort the list of annotations by type (highlight, drawing, text, bookmark). Selecting an annotation allows one to navigate to the location in the document containing the annotation. Selecting and holding the annotation allows one to remove, change the appearance of, hide or show that particular annotation, or rename the annotation. The second pane 903 (here, entitled "View") may allow a user to sort annotations based on their properties. For example, one may sort on the time created, time last accessed, by type, alphabetically, and on book order. Further, individual annotations may be switched on or off using controls on the page. Also, if all annotations have been switched off (or just those of a specific type of annotations have been switched off) and another annotation is created (or another annotation in that class), all annotations of that type may be switched back on. This may be extended to include all annotations being switched on if hidden and a new annotation added.

Annotation Scaling

As to scaling annotations, FIG. 10 shows a first set of annotations on a screen with a first resolution or size and a scaled version of the annotations on a screen with a second resolution or size.

The following example is used. Let $P_{original}(x,y)$ be the original position of a data point of an annotation. $N(x,y)$ is the new screen resolution. $O(x,y)$ is the original screen resolution. For each point $P_{new}(x,y)$, the new location of the scaled data point is given by the ratio of the new screen resolution over the old screen resolution for the x and y components of each:

$$P_{new}((P_{original}x \cdot N_x/O_x),(P_{original}y \cdot N_y/O_y))$$

This assumes that the x and y components are independent. So, various resolutions can easily be accommodated (for instance, 640×480 and 640×400).

An alternative embodiment includes normalizing ink annotations to a specified format. So, when displaying the ink annotations, the invention does not need to use the capturing screen resolution (because it in effect is already known due to the initial normalizing process). The system only needs to convert all retrieved annotations to fit the current screen res. Additional alternatives include minimizing processing by selecting the normalized resolution to correspond to the slowest computing platform.

Associating Ink Annotations with Information

In addition to permitting viewing of the underlying document despite numerous annotations, or document reflow or viewer modifications, and to avoid losing the power of the computer, these ink tasks may co-exist with traditional computing tasks. Specifically, to be useful on electronic documents, ink annotations should be able to survive changes in the underlying document.

Figure 12:
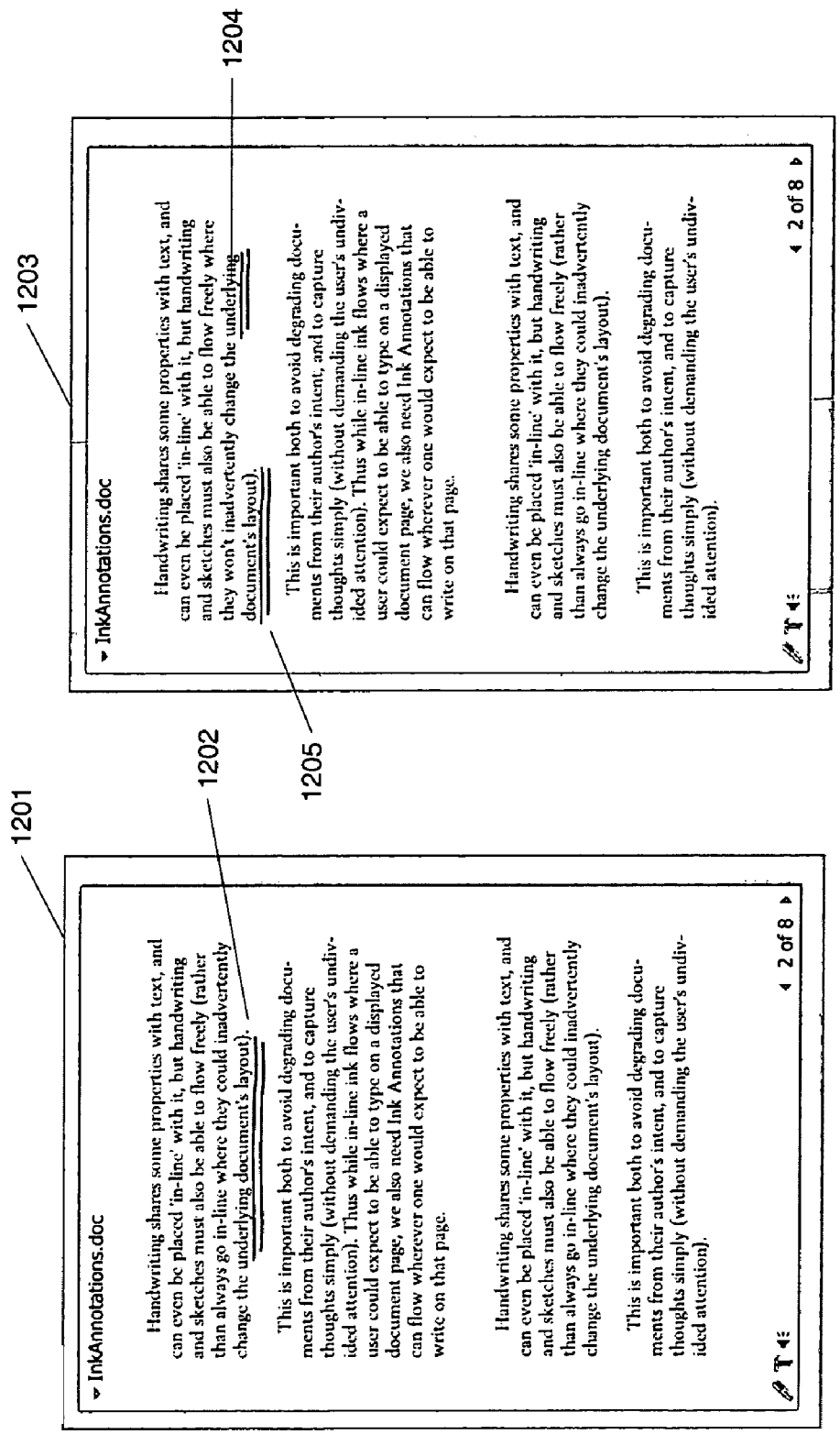
FIGS. 12-16 show associations of annotations with parts of displayed documents in accordance with embodiments of the present invention.

Survival in this context means continuing to convey both graphical meaning of the ink strokes, and association with the elements being annotated, even as those elements move or change. The current invention includes a set of methods for classifying, anchoring and transforming ink annotations such that they survive changes among the annotated elements. See, for example, FIG. 12, showing annotations before and after document re-flow maintaining their reference to the annotated subject matter.

The following description and associated Figures illustrate how ink and annotations may be transformed due to the change in appearance of a document. The document may change appearance due to a change in the content of the document or may change appearance due to a change in user preferences (for example, selecting a larger font size) without modification to the underlying document content. The transformation of ink in relation to both types of changes is considered to be part of the present invention.

The Starting Point: Stroke Classification and Multiple Independent Anchors

Ink annotations include graphical thoughts (sketches), verbal thoughts (handwritten words), and markings (e.g. underlining, highlighting, circling). Each of these has both graphical meaning of its own, and associations that may have changed its shape had the document been laid out differently. For example, with sketches it is important to keep accurate geometric relationships between the strokes (in X and Y), and to keep near in-line elements but not obscure them. With handwritten words, it is most important to keep words together and keep flow relationships between sequential words (in lines and columns). With marks on text, it is important to keep the associated portion of the mark properly related to the text it marks, in position and size, even as the text may change or move. To preserve the meaning and associations of ink annotations as the underlying elements move or change, the system and method recognize which strokes, and which groups of strokes, require each of these treatments.

Figure 13:
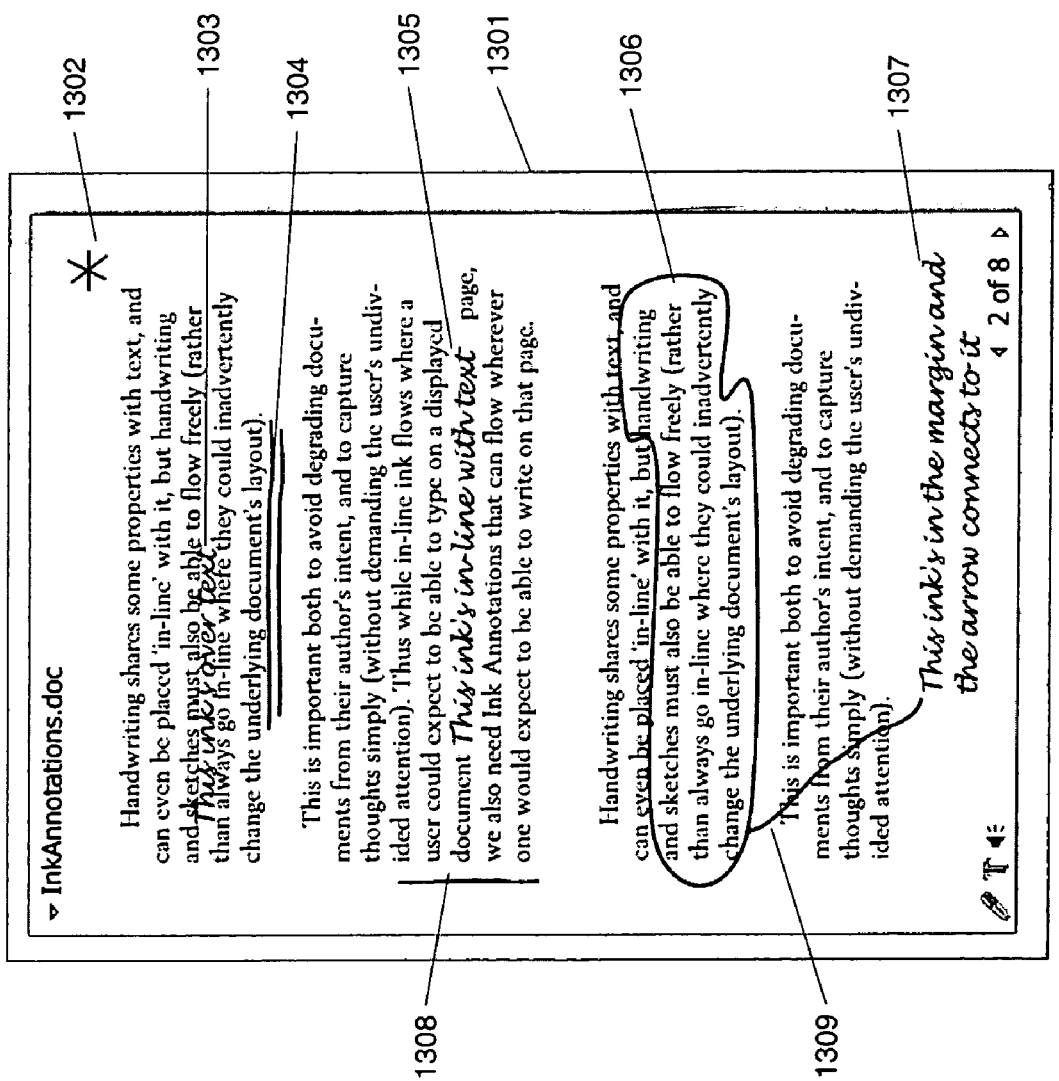

First, a stroke's shape and the geometric region or regions in which it lies can be used to classify it into one of several types. Next, proximity to objects can be used to anchor the stroke in ways that serve as further classification. FIG. 13 show a page 1301 that illustrates some but not all of the classifications of ink strokes:

1. The asterisk 1302 is a shape with graphical meaning (which the system and method do not need to recognize, only to preserve). It is located in a margin, where in addition to being anchored to the nearest in-line element, it can be considered primarily associated with the line that contains that element.

2. The words "This ink's over text" 1303 are a 'chain of strokes', the first of which was primarily related to the text immediately above or below it and the others primarily associated with the first to add meaning. To assure that the first stroke is associated with the correct word the system and method may use additional heuristics, or give anchor feedback to the user and allow manual correction. For example, the system may use an average or weighted average to determine a center of a 'chain of strokes' and associate the center with the nearest text. Also, the system may ask a user to select the text to which the annotation refers.

3. The words "underlying document's layout" are marked with a pair of strokes 1305, the first of which is considered to have marked the range of words (because it spans the range in a direction parallel to the line flow), and the second of which can be considered to have been chained to the first to add meaning. In an alternate embodiment, the system may also classify the second line as associated with the first line or associated with the same text as based on the time interval or on the presence of events between the creation of the first and second lines.

4. The vertical line 1308 in the left margin spans a range of words in the direction of column flow, and is considered to have marked the lines to the right of line 1308.

5. The outline 1306 of the words starting with "handwriting and sketches" is considered a group of segments, the horizontal ones marking words and the others marking lines.

6. The line 1309 connecting the outline to the margin note 1307 is a connector, with two primary anchors (one at each end) that may be completely independent elements.

7. The margin note 1307 itself is a chain of strokes related primarily to whichever of its strokes was laid down first, but also related to the margin and the text nearest that first stroke and the near end of the long line.

8. The words 'This ink's in-line with text' 1305 could have been meant as an annotation, but, because they were inserted into the flow of the text, they are classified as part of the document layout and not subject to anchoring and transformations.

In total, the system and method have five basic types of ink, only three of which are classified as annotations:

|  | 'Embedded' ink occupies in-line space | 'Overlaid' ink annotates |
| --- | --- | --- |
| 'in-line' associations flow w/ words | In-line words | 'Text Marks' (move horizontally and vertically w/words) |
| 'columnar' associations flow w/ lines (vertically for western text) | In-line paragraphs & sketches | 'Margin Notes' (move vertically w/lines) |
| 'connectors' flow and change shape | N/A | 'Connectors' (stretch) |

The system and method may use heuristics to anchor each stroke classified as an annotation. For example, first, the XY position in the window of the stroke's start gives a window anchor. Next, if the window's layout engine provides additional timely information about underlying regions and nearby elements, the system and method may create additional anchors used in the heuristics to support re-layout of the ink whenever an anchor element moves or changes. The following describes one example of heuristics, but it is appreciated that other heuristics may be used and are considered within the scope of the invention.

1. On finishing a stroke, the system and method check its proximity to other annotations with which it may also be associated.

2. The system checks its shape and, if linear, the system queries the layout engine for graphical regions to determine whether it fits in any one of three linear classes—parallel to a range of sequential elements (such as multiple text characters in a line, which may also include in-line ink or other objects), perpendicular to a sequence of such ranges (such as multiple lines in a column), or a connecting line associated with a pair of non-sequential elements. In one embodiment, the system uses a simple heuristic considering only height-to-width ratio and whether the ends are near opposite corners of the bounding box). If the width is greater than the height by a ratio (for example, the default may be 5×) and midpoints of the left and right edges of the bounding box mark text, it is classified as a horizontal text mark. If the nearest text is below, the system asks for object nearest above and chooses between them based on ratio of distances. This biases the classification of horizontal text marks as underlining (rather than 'overlining' which is assumed to be less common). If both ends mark in-line text or ink and its height is greater than width by a ratio (for example, the default may be 7×), it is classified as a vertical marking a range of lines. Otherwise if ends are near diagonal corners, it's a connecting line (may connect two in-line elements or connect one with a margin).

3. If the stroke or strokes is not classified as one of these linear classes, the system identifies the in-line element nearest the stroke's XY midpoint (including invisible in-line elements such as word space, tab space and line space) to use as an anchor. If the midpoint and the anchor element are horizontally apart by more than a threshold (for example, 0.2"), the system marks it as 'side margin'. If they are vertically apart by more than a threshold, the system marks it as 'top/bottom margin'.

4. If not in the margin, the system also notes the size of the anchor element so the ink can be re-scaled if the anchor element is re-scaled.

5. In addition to the window, region, and element anchors, the system also may link to any nearby overlaid element (typically an ink stroke, but could be an image, a shape or a text label). This is because if such overlaid elements form a sketch or word, maintaining their positions with respect to each other is more important than flowing with the embedded anchors. The resulting stroke chains—of which a handwritten word is an example—move and scale as units according to the position and scale of the first stroke in the chain. For example, if distance to a nearby ink stroke is below a threshold (for instance, 0.15"), an embodiment refers to this stroke as an additional anchor and flags the current stroke as 'near ink'.

6. At this point, the system has identified enough embedded anchors and sufficiently classified this stroke so that, when the system is notified that an anchor has changed, the system may transform the ink annotation appropriately.

Transformations Of Various Stroke Classes In Response To Various Anchor Changes

The system uses heuristics to re-layout strokes when an anchor moves. The following describes the one embodiment of these heuristics, but many variations are possible. This description assumes western text (vertical columns, flowing left-to-right). Directions would flip and/or rotate for eastern, and bi-directional flows would flip back and forth from line to line. Examples include the following.

Figure 14:
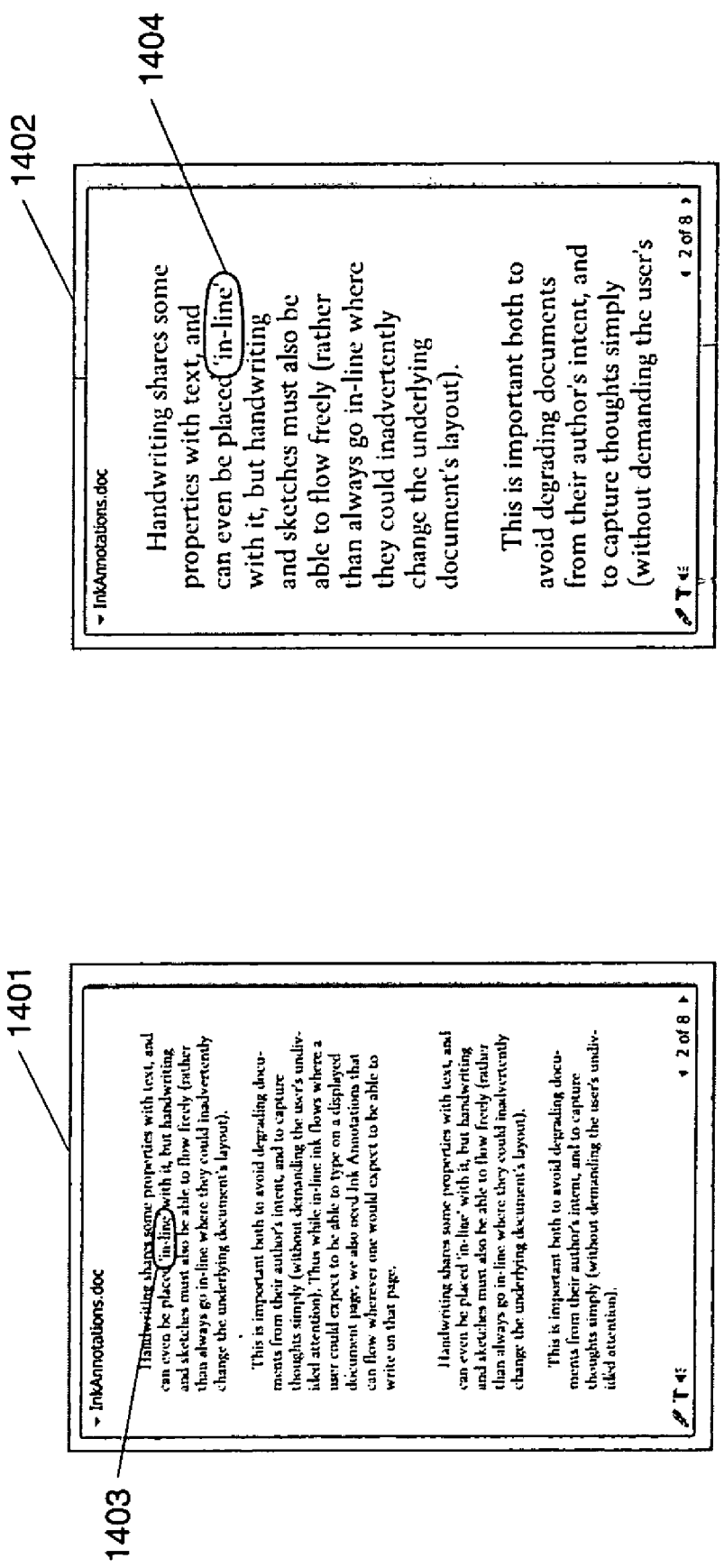

1. As shown in FIG. 14 of page 1401, ink 1403 anchored to a single position in an in-line flow, and not in a margin, re-positions and re-scales along with the element immediately preceding or following the anchor. Here, the outline 1403 on page 1401 continues to outline the text 'in-line' as 1404 in page 1402 despite the re-flow of text between the two pages, due to at least in part on the change in font size.

Figure 15:
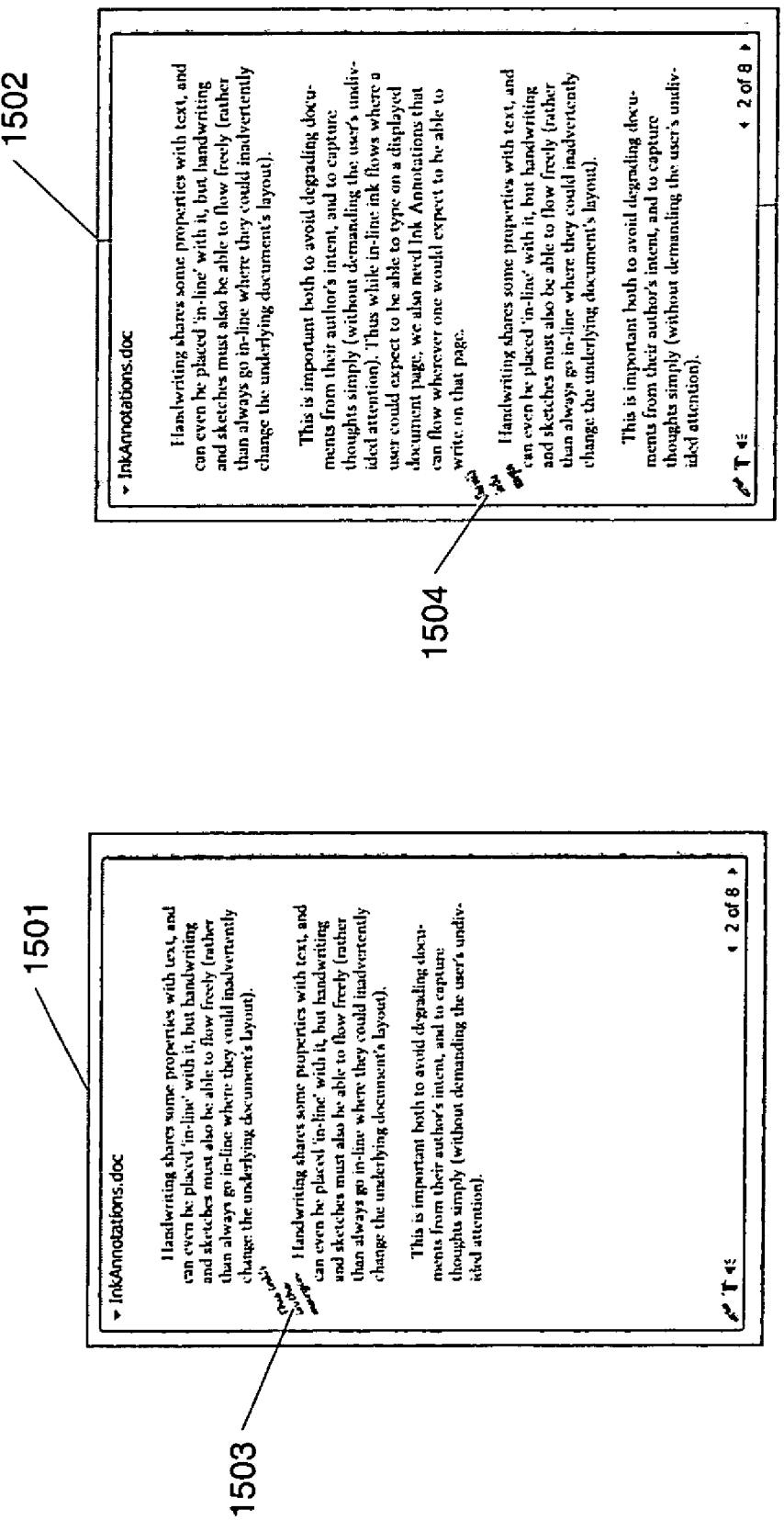

2. As shown in FIG. 15, ink 1503 whose primary anchors are a 'side margin' re-position vertically in same margin to remain alongside the text line containing its anchor, and clip or shrink horizontally if that margin shrinks independent of the anchor size (this avoids obscuring text or getting cropped at page edge). Here, ink 1503 is anchored to the margin along side text on page 1501. When the text is re-flowed, ink 1503 follows the anchored text and is adjusted for the margin size and rendered as 1504.

3. Ink whose primary anchors are 'top/bottom margin' (for example, asterisk 1302) re-position vertically only to keep distance from the line containing its anchor. It may be clipped vertically at the window edge if that margin shrinks. Document re-layout could move a top or bottom margin annotation to the next or previous page, where it would show in the same margin. Editing could cause multiple annotations to occupy the same margin, in which case the user needs to be able to move one without changing its anchoring.

4. A line that connects two points in text may have to be scaled and/or rotated and/or flipped in X and/or Y as the distance between its anchors changes.

Figure 16:
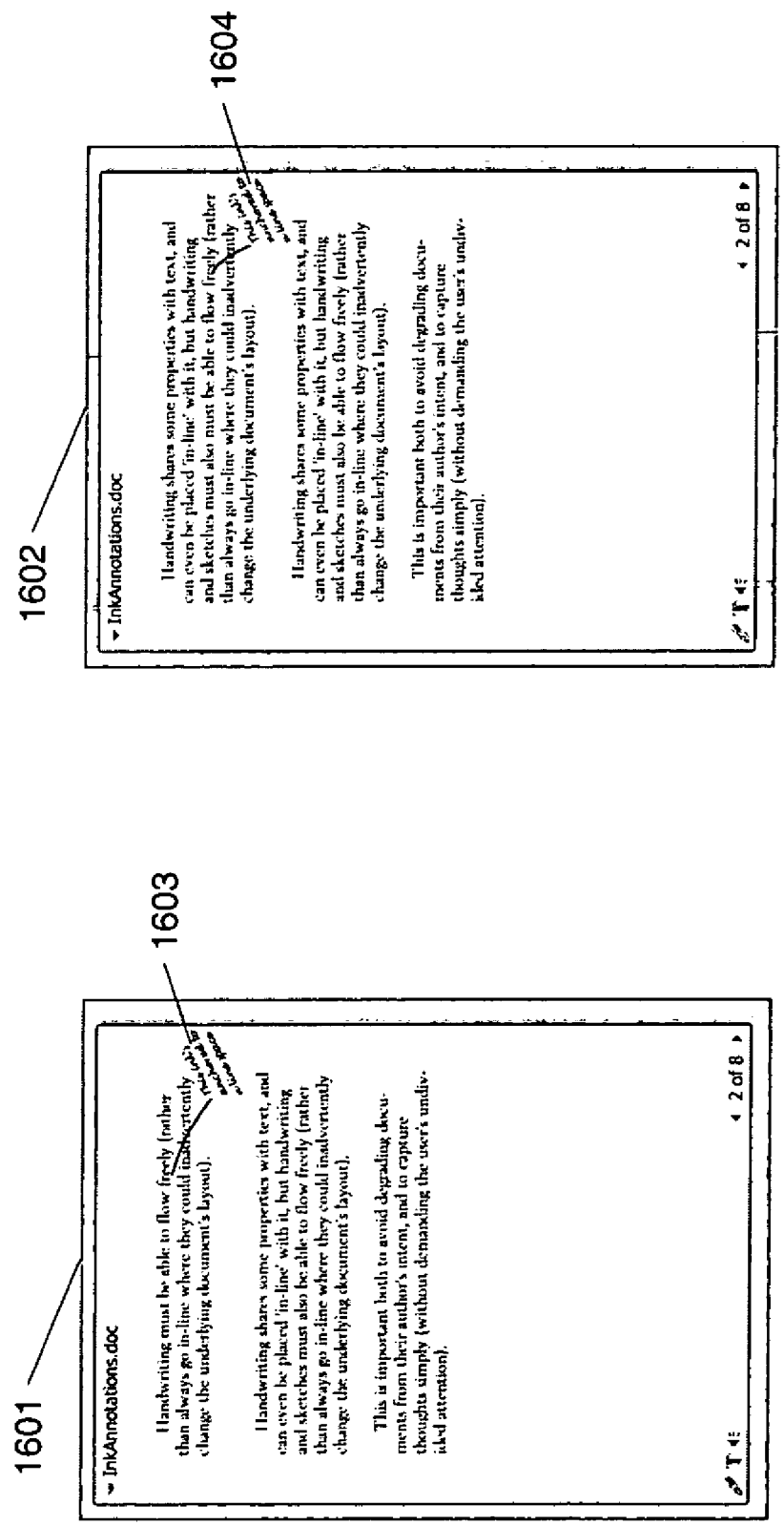

5. As shown in FIG. 16, a line 1606 that connects in-line elements to a margin note 1603 on page 1601 may similarly have to be scaled and/or rotated and/or flipped in X and/or Y as the distance between its anchors changes. The in-line end re-positions with its anchor as in reference to section 1 and FIG. 14 above. Also, the margin end repositions vertically with the line of its anchor as in sections 2 or 3 and FIG. 15 above. This results in line 1607 attached to a margin note 1604 on page 1602.

6. A line or segment marking a range of in-line elements should grow or shrink horizontally as the distance between its anchors changes. See FIG. 12 with page 1201 and double underlining 1202. When re-layout wraps one of the anchors through the end of a line, the mark 1202 is replicated onto both lines (as 1204 and 1205), showing as a line 1204 between start anchor (for example, the word 'underlying') and end of first line, plus a line 1205 between start of next line and end anchor (for example, the word 'layout).'). As additional line breaks are added, additional horizontal lines are shown spanning across the in-between lines. These lines are grouped so as to be selected as one. Thus, a single underline may be separated into two, three, or more underlines as needed to transform the annotation. Further, the transformations may be reversed for re-flowing multiple lines into one.

7. A stroke that is in any of the above stroke classifications and also near existing ink is re-positioned with that nearby ink, and scaled with it (unless the new ink is a connecting line, in which case it stretches to maintain associations at its ends). It is the association with nearby ink that allows words, in-line flows and sketches to keep together and thus preserve their graphical meaning.

Data Format, Rendering and Persistence

To make ink annotations useful across multiple systems and applications, a common way is needed to persist ink and related anchor information. The persistence format may carry the classification and anchoring info so that transformations can continue to convey the associations without losing the graphical meaning.

Annotations and ink include as persistence information a source, one or more links, and one or more targets. Ink annotations may also include information pertaining to each source as including one or more ink strokes with creation information (application, user, and time), plus optional style info (e.g. 12 pt., bold, red) and optional meaning info (e.g. sketch(es), word(s), paragraph(s) factoid type(s) and/or document type(s)). For an ink annotation, each link may include references to multiple independent anchors, some of which may be other annotations' sources.

Each ink annotation source may include:
1) Information per ink stroke
   A) XY position of first sample of this stroke, with respect to first sample of first stroke
2) Information per ink sample
   B) XY position of sample with respect to first sample of this stroke Each ink annotation source may also include:
1) Optional data per stroke
   A) Time stamp for start of stroke
   B) Sample rate
   C) Average pressure
   D) Average tilt
2) Optional data per sample
   A) Time stamp for sample
   B) Pressure
   C) Tilt
   D) Bezier Control Each ink annotation link includes:
1) Information per ink annotation
   A) XY position of first sample of first stroke with respect to primary anchor
   B) Scale of that anchor when annotated Each ink annotation link may also include:
1) Optional anchoring info per annotation
   A) For any shape: Margin tag (for unidirectional flow), and/or nearby ink anchor
   B) For connector: Connector type tag plus anchor info for second end, plus optional margin tag
   C) For range: Range type tag plus anchor info for second end, plus optional segment tag Support from Layout Engines Layout engines are known in the art. One well-known layout engine is that used in Trident, the layout engine for Microsoft Corporations' Internet Explorer browser. Other layout engines are known in the art. The layout engine determines positions of objects and regions. Thus, it may identify which objects are nearest an ink stroke, and which region or regions it falls in, and provide this info for inclusion in the annotation link. Specifically, the location of the nearest in-line object and the distance to that object will determine whether the annotation's flow is in-line, vertical (side margin), or none (top/bottom margin). Further, the layout engine may also give notice when any anchor appears, moves, or changes in appearance, so ink annotations can be transformed correctly.

In the foregoing specification, the present invention has been described with reference to specific exemplary embodiments thereof. Although the invention has been described in terms of various embodiments, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

We claim:

1. A computer-implemented method for adding electronic ink to displayed information on a system having a display, said method comprising the steps of:

classifying said electronic ink based on a shape of said electronic ink;

associating said classified electronic ink with at least one object of said displayed information; wherein said classifying step includes the step of determining said electronic ink's distance to other annotations.

2. The method according to claim 1, wherein said associating step further includes the step of:

anchoring said electronic ink to a file position of said at least one object.

3. The method of claim 1, wherein said step of classifying including classifying said electronic ink as a chain of strokes and said associating step includes associating a center of said chain of strokes with said at least one object.

4. A computer-implemented method for adding electronic ink to displayed information on a system having a display, said method comprising the steps of:

classifying said electronic ink based on a shape of said electronic ink;

associating said classified electronic ink with at least one object of said displayed information; wherein said classifying step includes the step of determining the ratio of said electronic ink height to width.

5. The method according to claim 4, wherein said associating step further includes the step of:

anchoring said electronic ink to said at least one object by adding a link to said displayed information.

6. The method according to claim 4, wherein said classifying step classifies said ink as text marks.

7. The method according to claim 4, wherein said classifying step classifies said ink as in-line paragraphs and sketches.

8. The method according to claim 4, wherein said classifying step classifies said ink as margin notes.

9. The method according to claim 4, wherein said classifying step classifies said ink as a connector.

10. A computer-implemented method for adding electronic ink to displayed information on a system having a display, said method comprising the steps of:

classifying said electronic ink;

associating said electronic ink with at least one object of said displayed information, wherein the relationship of said electronic ink to said at least one object is maintained despite re-flowing of said displayed information by a layout engine.

11. The method according to claim 10, wherein said classifying step classifies said ink as in-line words in which said at least one object is within a flow of text.

12. A computer readable medium having a program stored thereon, said program implementing a method for adding electronic ink to displayed information on a system having a display, said program comprising the steps of:

classifying said electronic ink based on shape of the electronic ink;

associating said classified electronic ink with at least one object of said displayed information; wherein said classifying step includes the step of determining its distance to other annotations.

13. The computer readable medium according to claim 12, wherein said classifying step classifies said electronic ink as one of embedded ink and overlaid ink.

14. The computer readable medium according to claim 12, wherein said associating step further includes the step of:

anchoring said electronic ink to said at least one object by adding a link to said displayed information.

15. A computer readable medium having a program stored thereon, said program implementing a method for adding electronic ink to displayed information on a system having a display, said program comprising the steps of:

classifying said electronic ink based on shape of the electronic ink;

associating said classified electronic ink with at least one object of said displayed information; wherein said classifying step includes the step of determining the ratio of said electronic ink height to width.

16. The computer readable medium according to claim 15, wherein said associating step further includes the step of:

anchoring said electronic ink to a file position of said at least one object.

17. The computer readable medium according to claim 15, wherein said associating step further includes the step of:

anchoring said electronic ink to said at least one object by adding a link at or near said object pointing to said electronic ink.

18. The computer readable medium according to claim 15, wherein the relationship of said electronic ink to said at least one object is maintained despite re-flowing of said displayed information by a layout engine.

19. The computer readable medium according to claim 15, wherein said classifying step classifies said ink as in-line words in which said at least one object is within a flow of text.

20. The computer readable medium according to claim 15, wherein said classifying step classifies said ink as text marks.

21. The computer readable medium according to claim 15, wherein said classifying step classifies said ink as in-line paragraphs and sketches.

22. The computer readable medium according to claim 15, wherein said classifying step classifies said ink as margin notes.

23. The computer readable medium according to claim 15, wherein said classifying step classifies said ink as a connector.

* * * * *